(12) United States Patent
Tsuzuki et al.

(10) Patent No.: US 9,180,491 B2
(45) Date of Patent: Nov. 10, 2015

(54) ULTRASOUND TRANSDUCER, ULTRASOUND PROBE AND MANUFACTURING METHOD OF ULTRASOUND TRANSDUCER

(75) Inventors: Kentaro Tsuzuki, Nasushiobara (JP); Takashi Kubota, Otawara (JP); Yutaka Oonuki, Otawara (JP); Yasuhisa Makita, Nasushiobara (JP)

(73) Assignees: KABUSHIKI KAISHA TOSHIBA, Tokyo (JP); TOSHIBA MEDICAL SYSTEMS CORPORATION, Otawara-Shi (JP)

( * ) Notice: Subject to any disclaimer, the term of this patent is extended or adjusted under 35 U.S.C. 154(b) by 0 days.

(21) Appl. No.: 13/823,629

(22) PCT Filed: Jan. 27, 2012

(86) PCT No.: PCT/JP2012/051877
§ 371 (c)(1),
(2), (4) Date: Mar. 14, 2013

(87) PCT Pub. No.: WO2012/102394
PCT Pub. Date: Aug. 2, 2012

(65) Prior Publication Data
US 2013/0293066 A1 Nov. 7, 2013

(30) Foreign Application Priority Data
Jan. 28, 2011 (JP) ................. 2011-015941

(51) Int. Cl.
*H01L 41/00* (2013.01)
*B06B 1/06* (2006.01)
*B32B 38/00* (2006.01)

(52) U.S. Cl.
CPC .............. *B06B 1/0629* (2013.01); *B06B 1/067* (2013.01); *B32B 38/0004* (2013.01); *Y10T 156/1082* (2015.01)

(58) Field of Classification Search
USPC .................. 310/322, 326, 327, 334; 29/25.35
See application file for complete search history.

(56) References Cited

U.S. PATENT DOCUMENTS 7,518,290 B2 * 4/2009 Frey ............................... 310/334
(Continued)

FOREIGN PATENT DOCUMENTS

CN 101103927 A 1/2008
(Continued)

OTHER PUBLICATIONS

International Search Report International Application No. PCT/JP2012/051877 mailed on Mar. 6, 2012.
Chinese Office Action with its English Summary for the corresponding Chinese Patent Application No. 201280003673.1 mailed on Feb. 2, 2015.

*Primary Examiner* — Thomas Dougherty
(74) *Attorney, Agent, or Firm* — Yoshida & Associates, LLC

(57) ABSTRACT

The purpose is to provide an ultrasound transducer and ultrasound probe without the complexity of the manufacturing process of the non-conductive acoustic matching layer while ensuring the electric conductive path. Pluralities of two-dimensionally arranged piezoelectrics are comprised in the ultrasound transducer. Electrodes are provided for each piezoelectric. Furthermore, the non-conductive acoustic matching layer with the first surface on the electrode side and the second surface on the opposite side of the first surface is comprised in the ultrasound transducer, and moreover, the electric conductive acoustic matching layer arranged on the second surface side of the non-conductive acoustic matching layer is comprised in the ultrasound transducer. Moreover, the substrate arranged on the opposite side of the non-conductive acoustic matching layer is arranged with respect to the electric conductive acoustic matching layer. The plurality of grooves penetrating the non-conductive acoustic matching layer, leading up to mid-way of the piezoelectrics of the first surface side or mid-way of the electric conductive acoustic matching layer of the second surface side is formed between the first surface and the second surface of the non-conductive acoustic matching layer. Moreover, the electrode and the substrate are electrically conducted via the groove.

20 Claims, 27 Drawing Sheets

(56) References Cited

U.S. PATENT DOCUMENTS

| | | |
|---|---|---|
| 7,781,938 B2 * | 8/2010 | Sugiura et al. ............... 310/334 |
| 8,035,278 B2 | 10/2011 | Shikata et al. |
| 2008/0015443 A1 | 1/2008 | Hosono et al. |
| 2009/0134746 A1 * | 5/2009 | Shikata et al. ............... 310/334 |
| 2010/0204583 A1 | 8/2010 | Rhim et al. |

FOREIGN PATENT DOCUMENTS

| | | |
|---|---|---|
| JP | 2005-086458 A | 3/2005 |
| JP | 2008-244859 A | 10/2008 |
| JP | 2009-130611 A | 6/2009 |
| JP | 2009-177342 A | 8/2009 |
| JP | 2010-184114 A | 8/2010 |

* cited by examiner

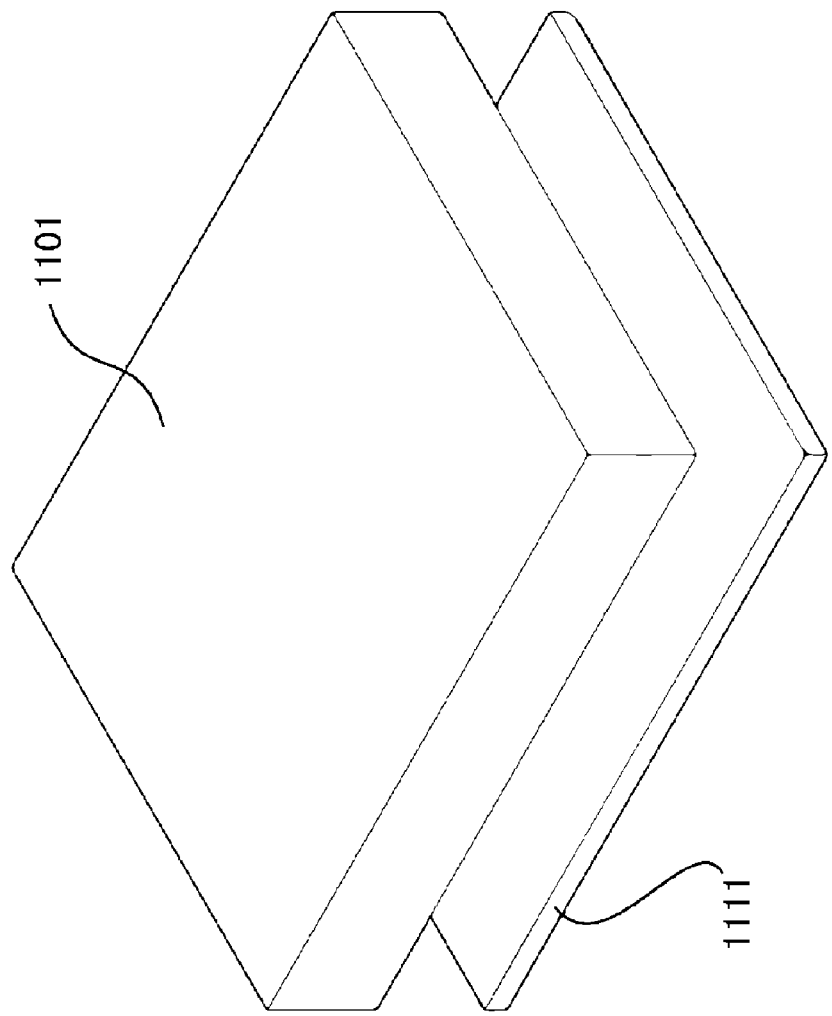

ULTRASOUND TRANSDUCER, ULTRASOUND PROBE AND MANUFACTURING METHOD OF ULTRASOUND TRANSDUCER

CROSS-REFERENCE TO RELATED APPLICATIONS

This application is based upon and claims the benefit of priority from Japanese Patent Applications No. 2011-015941, filed on Jan. 28, 2011; the entire contents of all of which are incorporated herein by reference.

FIELD OF THE INVENTION

The embodiment of the present invention relates to an ultrasound transducer, an ultrasound probe and a manufacturing method of an ultrasound transducer.

BACKGROUND OF THE INVENTION

The ultrasound probe has a plurality of piezoelectric bodies and an electrode to apply voltage between the piezoelectric bodies. There are various ways of deriving electricity from electrodes on the piezoelectric bodies. For example, there is a method of conductive the electrode with FPC (Flexible Printed Circuits), the electrode being arranged in front of the ultrasound radiation direction side of piezoelectric bodies. Signals derived from FPC are transmitted to a transmitter-receiver circuit.

Generally, the acoustic impedance of polyimides used as the base material of the FPC is approximately 3 Mrayl. Moreover, the acoustic impedance of piezoelectric bodies is 30 Mrayl or more. Due to such large differences, acoustic mismatching occurs when the FPC is directly connected to the piezoelectric bodies. When acoustic mismatching occurs, ultrasound beams are reflected in a boundary with great variance in acoustic impedance. One of methods to solve this is to provide an acoustic matching layer as an intermediate layer to efficiently propagate ultrasound waves between the FPC and the piezoelectric bodies.

Moreover, in order to reduce the acoustic mismatching mentioned above, a plurality of acoustic matching layers are sometimes configured. In said configuration, a plurality of acoustic matching layers are stacked in stages, the acoustic matching layers having different acoustic impedance between the acoustic impedance of FPC (for example, 3 Mrayl) and the acoustic impedance of piezoelectric bodies (for example, 30 Mrayl).

In said configuration, for example, if the acoustic impedance preferred for the first layer of the acoustic matching layers is approximately 9 to 15 Mrayl, a material having such acoustic impedance may be a machinable ceramic. Machinable ceramics are mainly composed of mica and are non-conductive.

Here, a configuration that electrically conducts from the electrodes of the piezoelectric bodies to FPC (conductive path) must be formed. Accordingly, when arranging the non-conductive acoustic matching layer on the first layer, the conductive path must be provided on said non-conductive acoustic matching layer.

For example, in a two-dimensional array ultrasound transducer, electrodes must be derived to the FPC from each of a huge number of elements. Therefore, conventionally, an ultrasound transducer configured with an open hole with electric conductivity is provided in correspondence with the number and arrangement of the piezoelectric bodies in the layering direction with respect to the non-conductive acoustic matching layer. In said ultrasound transducer, several open holes are provided on the acoustic matching layer and all surfaces of said open hole are, for example, plated in order to ensure the conductive path.

Moreover, there is conventionally a method of manufacturing the ultrasound transducer having: forming a board with the non-conductive material provided with a conductive film on both surfaces, and overlapping both surfaces of the conductive film of the board thereof to form the non-conductive acoustic matching layer. As an example, a board of the non-conductive material having the same width as the pitch of piezoelectric bodies is formed, and the conductive film is provided on both surfaces thereof. These boards are overlapped in a number corresponding to the number of columns or rows of the piezoelectric bodies to form several blocks, and to further overlap the blocks to form the acoustic matching layer. The acoustic matching layer formed by these processes allows the board and a overlapped surface of the board to function as the conductive path between the electrode and the FPC.

PRIOR ART DOCUMENTS

Patent Documents

[Patent Document 1] Japanese published unexamined application 2009-130611

[Patent Document 2] Japanese published unexamined application 2009-177342

SUMMARY OF THE INVENTION

Problem to be Solved by the Invention

However, according to said manufacturing method, the manufacturing process becomes complicated. Moreover, alignment is difficult, resulting in high manufacturing costs. For example, in the process of manufacturing the open holes in correspondence with the number and arrangement of the piezoelectric bodies, there is a risk of the cost being increased, and moreover, the operation involving ensuring the accuracy of the open hole position is difficult. Moreover, the manufacturing process of the acoustic matching layer involving forming the conductive film on the board of the non-conductive material and then overlapping this is complicated, with a danger of causing a further increase in the manufacturing cost.

The purpose of this embodiment is to provide an ultrasound transducer that ensures the conductive path between the substrate and the piezoelectric bodies while avoiding complications in the manufacturing process of the non-conductive acoustic matching layer, as well as the manufacturing method and ultrasound probe thereof.

Means of Solving the Problem

The ultrasound transducer related to this embodiment comprises a plurality of two-dimensionally arranged piezoelectric bodies. The electrode is provided on respective piezoelectric bodies. Furthermore, the ultrasound transducer comprises the non-conductive acoustic matching layer arranged with a first surface and a second surface on the opposite side of the first surface, on the electrode side, as well as an electric conductive acoustic matching layer arranged on said second surface. Moreover, the ultrasound transducer comprises the substrate arranged on the second surface side of the non-conductive acoustic matching layer. A plurality of grooves penetrating the non-conductive acoustic matching layer and leading up to mid-way of the piezoelectric bodies, the electric conductive acoustic matching layer, or the substrate are provided between the first surface and the second surface of the non-conductive acoustic matching layer. Moreover, the electrode and substrate are electrically conducted via the grooves.

BRIEF DESCRIPTION OF THE DRAWINGS

FIG. 4 is a schematic perspective view showing a part of the manufacturing process of the ultrasound transducer related to Embodiment 1.

MODE FOR CARRYING OUT THE INVENTION

With reference to FIGS. 1 to 24, the ultrasound transducer, the manufacturing method thereof, and the ultrasound probe related to Embodiments 1 to 3 are set forth in the following.

[Embodiment 1]

(Schematic Configuration of the Ultrasound Transducer

Figure 1:
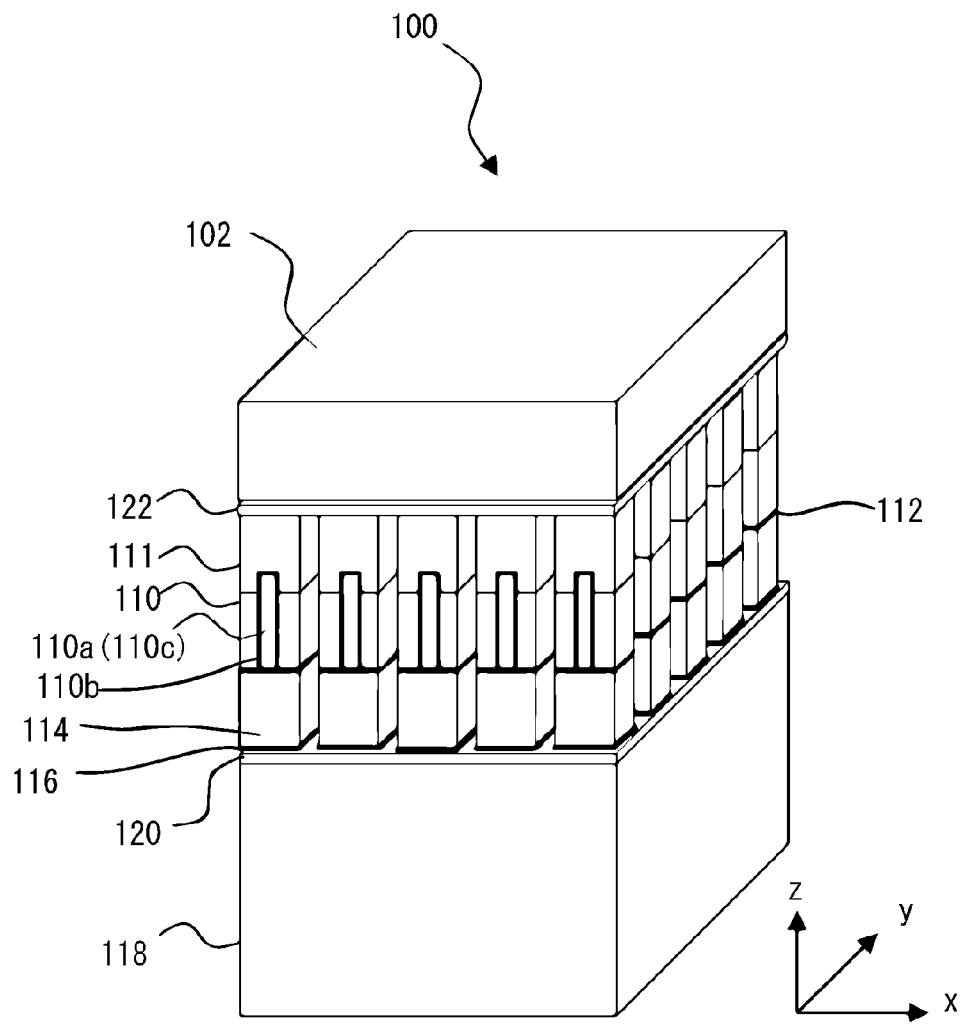
FIG. 1 is a schematic perspective view showing the outline of the ultrasound transducer related to Embodiment 1.

The outline of an ultrasound transducer 100 in Embodiment 1 is described with reference to FIGS. 1 to 8. FIG. 1 is a schematic perspective view showing the outline of the ultrasound transducer 100 related to Embodiment 1. The schematic configuration of the ultrasound transducer 100 related to the present embodiment is described in the following.

Furthermore, the number of arranged piezoelectrics (piezoelectric bodies) 114 of the ultrasound transducer 100 shown in FIG. 1 is conceptually shown. Moreover, the illustrated shape formed by the entire arrangement (e.g. the number of columns and number of rows in the two-dimensional array) is no more than one example, and other configurations may be applied.

Moreover, in the description below, the direction from a backing material 118 to an electric conductive acoustic matching layer 111 is referred to as the "front" (z direction in FIG. 1) and the direction of opposite to the front direction is referred to as the rear. Moreover, the front side surface of each component part in the ultrasound transducer is referred to as the "front surface," while the surface of the rear side is referred to as the "back surface."

As shown in FIG. 1, in the ultrasound transducer 100 related to this embodiment, the piezoelectrics 114 are two-dimensionally arranged on the xy surface. Moreover, the non-conductive acoustic matching layer 110 is provided corresponding to each front surface of respective piezoelectrics 114. Furthermore, the electric conductive acoustic matching layer 111 is provided on the front surface side of the non-conductive acoustic matching layer 110. Moreover, the backing material (material load phase) 118 is provided on the back surface side of the piezoelectrics 114, with a rear substrate 120 provided between the backing material 118 and the piezoelectrics 114. Moreover, in the ultrasound transducer 100, the rear substrate 120 is derived on at least the circuit side of a subsequent stage such as a transmitter-receiver circuit; however, in FIG. 1, an illustration of the section of the rear substrate 120 is omitted.

Moreover, as shown in FIG. 1, a front substrate 122 is provided on the front surface side of the electric conductive acoustic matching layer 111. An acoustic lens 102 is further provided on the front surface side of the front substrate 122. Moreover, in the same manner as the rear substrate 120, an illustration of the part extending to the circuit of the subsequent stage is also omitted in the front substrate 122 of FIG. 1. Moreover, a front surface electrode 112 is provided on the front surface side of the piezoelectrics 114, with the front surface electrode 112 adjacent to the back surface of the non-conductive acoustic matching layer 110. Furthermore, a back surface electrode 116 is provided on the back surface side of the piezoelectrics 114. Each part configuring the ultrasound transducer 100 is described in the following.

<Piezoelectrics>

The piezoelectrics 114 convert the voltage applied to the back surface electrode 116 and the front surface electrode 112 into an ultrasound pulse. This ultrasound pulse is wave-transmitted to a subject as a test object of the ultrasound diagnostic equipment. Moreover, the piezoelectrics 114 receive a reflected wave from the subject and convert this into voltage. As a material of the piezoelectrics 114, generally, PZT (lead zirconate titanate/Pb (Zr,Ti) $O_3$), barium titanate (BaTiO$_3$), PZNT (Pb (Zn1/3Nb2/3) O3-PbTiO3) single crystal, PMNT (Pb (Mg1/3Nb2/3) O3-PbTiO3) single crystal, etc., may be used. The acoustic impedance of the piezoelectrics 114 is, for example, approximately 30 Mrayl. Moreover, although the piezoelectrics 114 in FIG. 1 are configured as a single layer, they may also be configured as piezoelectrics 114 of multiple layers.

<Backing Material>

The backing material 118 absorbs the ultrasound pulse emitted to the opposite side (rear) from the irradiation direction of the ultrasound wave during wave-transmission of the ultrasound pulse, in order to suppress excess vibrations of the respective piezoelectrics 114. The backing material 118 allows reflection from the back surface of the respective piezoelectrics 114 during vibration to be suppressed to avoid any negative influence caused during transmission and receiving of the ultrasound pulse. Moreover, from the perspective of acoustic attenuation, acoustic impedance, etc., the backing material 118 may be any materials such as an epoxy resin containing PZT powder, tungsten powder, etc., rubber filled with polyvinyl chloride and/or ferrite powder, or porous ceramic impregnated with resin such as epoxy, etc.

<Front substrate, Rear Substrate>

The front substrate 122 and the rear substrate 120 are, for example, a FPC (Flexible Printed Circuits), each with a length leading to the circuit of the subsequent stage of the transmitter-receiver circuit, etc.

Moreover, a connecting lead (not illustrated, e.g. a wiring pattern) connected to the circuit of the subsequent stage, is provided on one or both of the front surface side and the back surface side of each of the front substrate 122 and the rear substrate 120. Regarding the front substrate 122 and the rear substrate 120, for example, polyimides are used as the base material. The acoustic impedance of the polyimides is approximately 3 Mrayl.

<Acoustic Matching Layer>

Figure 2:
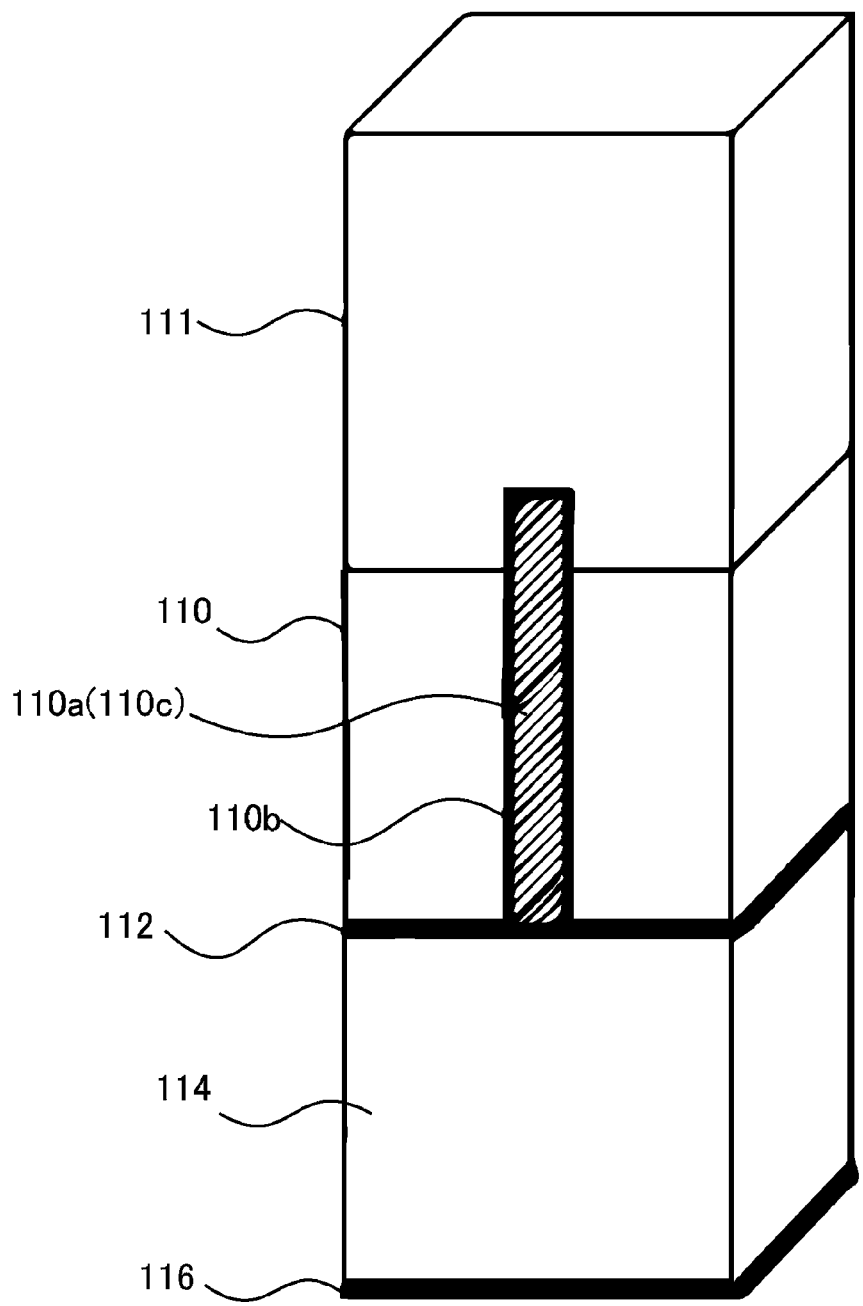
FIG. 2 is a schematic perspective view showing the laminates of the acoustic matching layer and the piezoelectric bodies related to Embodiment 1.
Figure 3A:
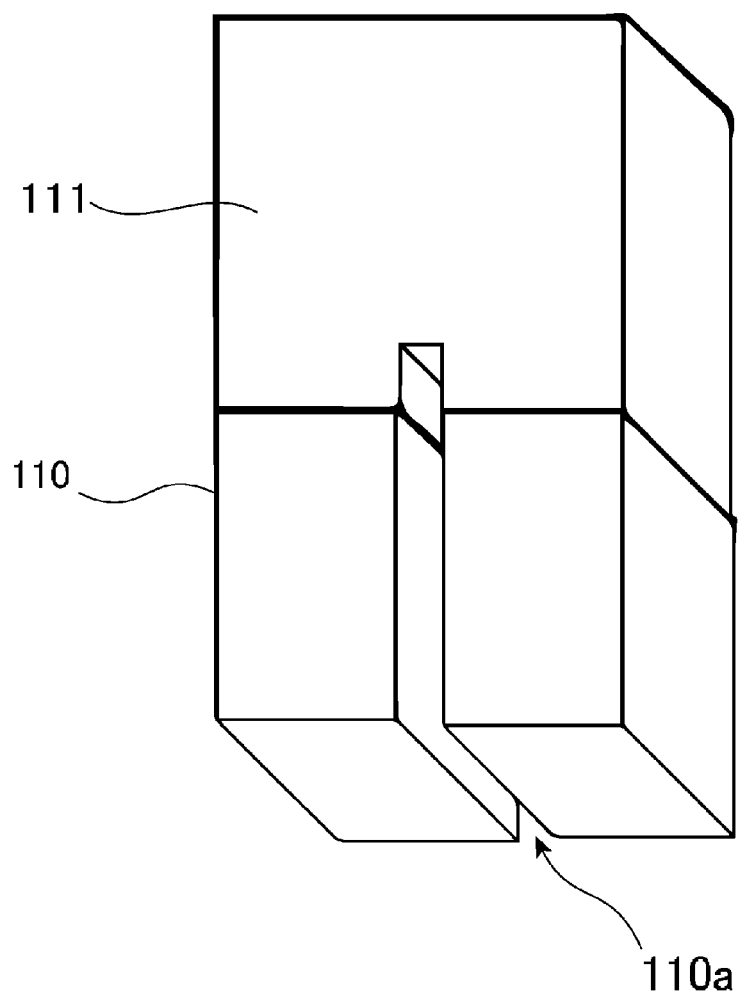
FIG. 3A is a schematic perspective view showing the groove in the laminates of the non-conductive acoustic matching layer and the electric conductive acoustic matching layer related to Embodiment 1.
Figure 3B:
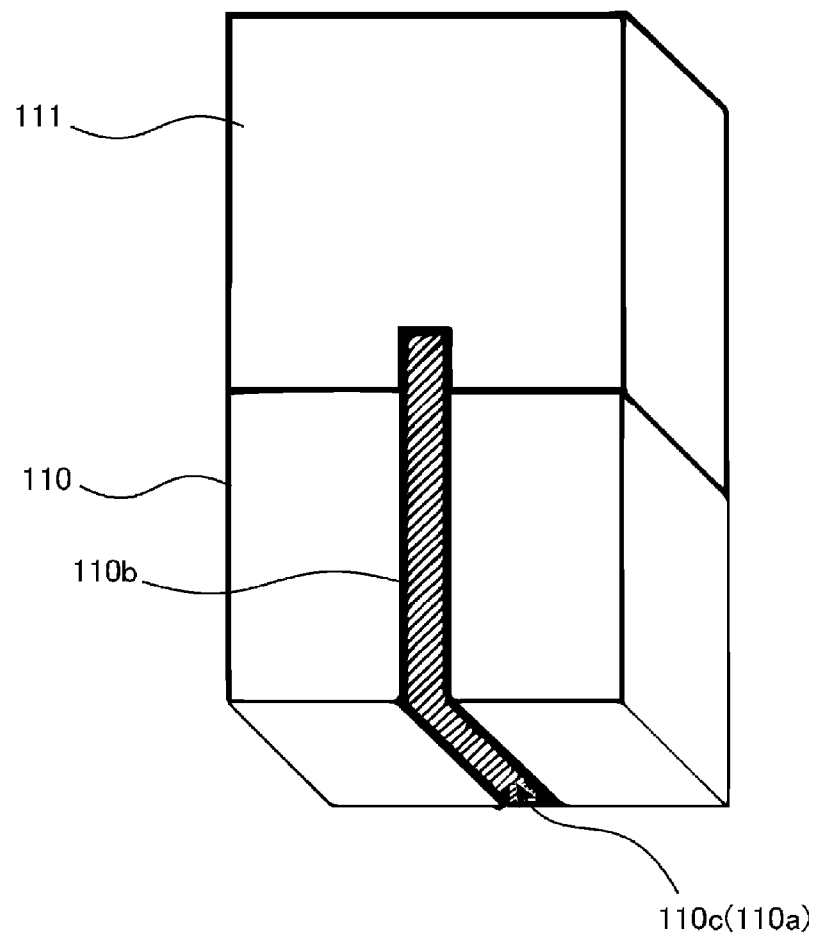
FIG. 3B is a schematic perspective view showing the resin filling the gap of FIG. 3A.

Next, the non-conductive acoustic matching layer 110 and the electric conductive acoustic matching layer 111 of the present embodiment are described with reference to FIG. 2, FIG. 3A, and FIG. 3B. FIG. 2 is a schematic perspective view showing the laminate of the acoustic matching layer (111, 110) and the piezoelectrics 114 related to Embodiment 1. FIG. 3A is a schematic perspective view showing a groove 110$a$ of the laminate of the non-conductive acoustic matching layer 110 and the electric conductive acoustic matching layer 111 related to Embodiment 1. FIG. 3B is a schematic perspective view showing the resin 110$c$ filling the gap 110$a$ of FIG. 3A.

The non-conductive acoustic matching layer 110 and the electric conductive acoustic matching layer 111 adjust the acoustic impedance between the piezoelectrics 114 and the subject. Therefore, the non-conductive acoustic matching layer 110 and the electric conductive acoustic matching layer 111 are arranged between the piezoelectrics 114 and the front substrate 122 (refer to FIG. 1), while a material with different acoustic impedance is respectively used in the non-conductive acoustic matching layer 110 and the electric conductive acoustic matching layer 111. Acoustic matching is achieved by gradually changing the acoustic impedance between the piezoelectrics 114 and an acoustic lens 102. Moreover, a material allowing for machining of metals is used in the non-conductive acoustic matching layer 110.

Examples of the non-conductive acoustic matching layer 110 allowing for machining with acoustic impedance optimal for abutting the piezoelectrics 114 include machinable glass, machinable ceramics, a mixture of an epoxy and metal oxide powder and a mixture of an epoxy and metal powder, etc. The acoustic impedance of this non-conductive acoustic matching layer 110 is approximately 9 to 15 Mrayl. Moreover, example materials of the electric conductive acoustic matching layer 111 with acoustic impedance optimal for arranging between the non-conductive acoustic matching layer 110 and the front substrate 122 include carbons (isotropic graphite and/or graphite). The acoustic impedance of this electric conductive acoustic matching layer 111 is approximately 4 to 7 Mrayl. Moreover, the thickness of the electric conductive acoustic matching layer 111 (length of the front-back connection) is, for example, 150 μm to 200 μm.

As shown in FIG. 2, a groove 110$a$ reaching from the boundary surface with the front surface electrode 112 (back surface of the non-conductive acoustic matching layer 110) to the boundary surface with the electric conductive acoustic matching layer 111 (front surface of the non-conductive acoustic matching layer 110) is provided in the non-conductive acoustic matching layer 110 of Embodiment 1. That is, the groove 110$a$ is configured to penetrate the non-conductive acoustic matching layer 110. Furthermore, this groove penetrates up to mid-way of the electric conductive acoustic matching layer 111 through the front surface of the non-conductive acoustic matching layer 110. That is, as shown in FIG. 3A, the groove 110$a$ is provided leading up to mid-way of the electric conductive acoustic matching layer 111 from the back surface of the non-conductive acoustic matching layer 110 via the front surface of the electric conductive acoustic matching layer 111. Here, "up to mid-way of the electric conductive acoustic matching layer 111" indicates, for example, approximately 10 μm from the back surface to the front surface (z direction of FIG. 1) of the electric conductive acoustic matching layer 111 with a thickness of 150 nm to 220 nm.

Moreover, the groove 110$a$ of Embodiment 1 is provided so as to reach from one side surface to the other side surface on the opposite side in an element array direction (columns or rows/x or y direction of FIG. 1). That is, the groove 110$a$ is configured to penetrate the non-conductive acoustic matching layer 110 and the electric conductive acoustic matching layer 111 in the element array direction. According to such a configuration of the groove 110$a$, when providing the groove 110$a$ to each element (the laminate of the non-conductive acoustic matching layer 110 and the electric conductive acoustic matching layer 111), the respective grooves 110$a$ may be respectively provided in a single process to the element belonging to one column or one row in the element array (refer to FIG. 6 to FIG. 8). Furthermore, the element array direction is the direction perpendicular to the front-back direction of the ultrasound transducer 100. Moreover, if it is possible to provide the grooves at once in the respective elements (laminate) belonging to one column or one row, the elements positioned on both ends of the element array direction do not always have to penetrate in the element array direction.

Moreover, inside the groove 110a in the non-conductive acoustic matching layer 110 and the electric conductive acoustic matching layer 111 shown in FIG. 3A, a conductive film 110b is provided throughout the entire surface thereof by plating, spattering, etc. The groove 110a is provided up to mid-way of the electric conductive acoustic matching layer 111 from the back surface of the non-conductive acoustic matching layer 110 via the back surface of the electric conductive acoustic matching layer 111; thereby, the conductive film 110b becomes an electrical conductive path between the back surface of the non-conductive acoustic matching layer 110 and the back surface of the electric conductive acoustic matching layer 111. That is, the conductive film 110b is provided throughout the entire surface of the groove 110a such that an electrical connection is made from one end to the other of the groove 110a. As a result, the front surface electrode 112 adjacent to the non-conductive acoustic matching layer 110 is conducted with the wiring pattern of the front substrate 122 via the conductive film 110b and the electric conductive acoustic matching layer 111.

Moreover, as shown in FIG. 3B, a resin 110c is further filled inside the conductive film 110b of the groove 110a in the non-conductive acoustic matching layer 110 and the electric conductive acoustic matching layer 111. An epoxy adhesive, etc., may be used in this resin 110c. By means of filling the groove 110a with this resin 110c, effects from forming the groove 110a in the non-conductive acoustic matching layer 110 may be suppressed. However, filling this resin 110c in the groove 110a is not necessarily required. That is, depending on the shape of the element (laminate) and/or the relationship with the vibration mode of the ultrasound transducer 100, it is necessary to avoid acoustic effects caused due to providing the groove 110a in the acoustic matching layer, but providing the resin 110c is not required in other cases.

Moreover, when using the groove 110a as a subdie in order to suppress unnecessary vibrations, the groove 110a corresponding to the subdie may be left empty, or may be filled with a desired medium. Moreover, a case was described in which the conductive film 110b is provided throughout the entire inner surface of the groove 110a; however, it is not necessarily limited to this case. That is, the front surface electrode 112 and the electric conductive acoustic matching layer 111 should be electrically conducted via the non-conductive acoustic matching layer 10; therefore, within the inside of the grooves 110a, the conductive film 110b may be partially formed such that the end of the back surface side of the non-conductive acoustic matching layer 110 is passed to the electric conductive acoustic matching layer 111. Moreover, not limited to the conductive film 110b, if a connecting lead may be provided, a configuration of this kind may also be adopted.

Moreover, each one groove 110a is provided in the each laminate of the non-conductive acoustic matching layer 110 and the electric conductive acoustic matching layer 111 shown in FIGS. 1 to 3A, FIG. 3B; however, if a plurality of grooves 110a is provided, a configuration of that kind may also be adopted. Moreover, the groove 110a shown in FIGS. 1 to 3A, FIG. 3B is provided in parallel to the irradiation direction of the ultrasound waves (front-back direction of the element) in the ultrasound transducer 100; however, it is not necessarily limited to such a configuration. For example, the groove may be provided such that the groove depth changes in contrast with the front-back direction of the element.

Moreover, in the ultrasound transducer 100 in FIG. 1, the piezoelectrics 114, non-conductive acoustic matching layer 110, electric conductive acoustic matching layer 111, front substrate 122, and acoustic lens 102 are arranged in order from the rear to the front; however, without limiting to such a configuration, the acoustic matching layer may be three layers or more. For example, the non-conductive acoustic matching layer 110, the electric conductive acoustic matching layer 111, and the front substrate 122 may be arranged in order from the rear to the front, and furthermore, from the viewpoint of acoustic adjustment with the acoustic lens 102, the acoustic matching layer may be arranged on the front of the front substrate 122.

The width of the groove 110a is preferably approximately 30% of the element width, for example, about 10 μm. That is, by configuring the groove width of the groove 110a in this manner, it is effective for the radiation performance of the ultrasound pulse, the vibration mode of the ultrasound transducer 100, and the formation process of the conductive film 110b. Here, "element" is the laminate of the piezoelectrics 114, non-conductive acoustic matching layer 110, and electric conductive acoustic matching layer 111 (refer to FIG. 2). Moreover, "element width" is the width of the element array of the groove 110a of the ultrasound transducer 100 (for example, x direction or y direction of FIG. 1). Moreover, although the illustrated element has a substantially square-shaped cross-section, not limited to this, the cross-section may be substantially rectangular.

<Acoustic Lens>

The acoustic lens 102 (refer to FIG. 1) converges the transmitted and received ultrasound waves to shape them like a beam. Silicone having acoustic impedance similar to that of a living body, etc. is used as materials for the acoustic lens 102.
(Abstract of the Manufacturing Method of the Ultrasound Transducer)

Next, with reference to FIGS. 4 to 8, the manufacturing method of the ultrasound transducer 100 related to Embodiment 1, particularly the process of providing the groove 110a on the non-conductive acoustic matching layer 110 and electric conductive acoustic matching layer 111, is mainly set forth. FIGS. 4 to 8 are schematic perspective views showing the manufacturing process of the ultrasound transducer 100 related to Embodiment 1.
<Block Connection/FIG. 4/FIG. 5>

As illustrated in FIGS. 1 to 3, the acoustic matching layer in the ultrasound transducer 100 of the present embodiment is configured by layering the non-conductive acoustic matching layer 110 and the electric conductive acoustic matching layer 111. In forming this acoustic matching layer, as shown in FIG. 4, a non-conductive material block 1101 configured with materials necessary for the non-conductive acoustic matching layer 110 is used. In the same manner, the electric conductive material block 1111 configured with materials necessary for the electric conductive acoustic matching layer 111 is used.

Figure 5:
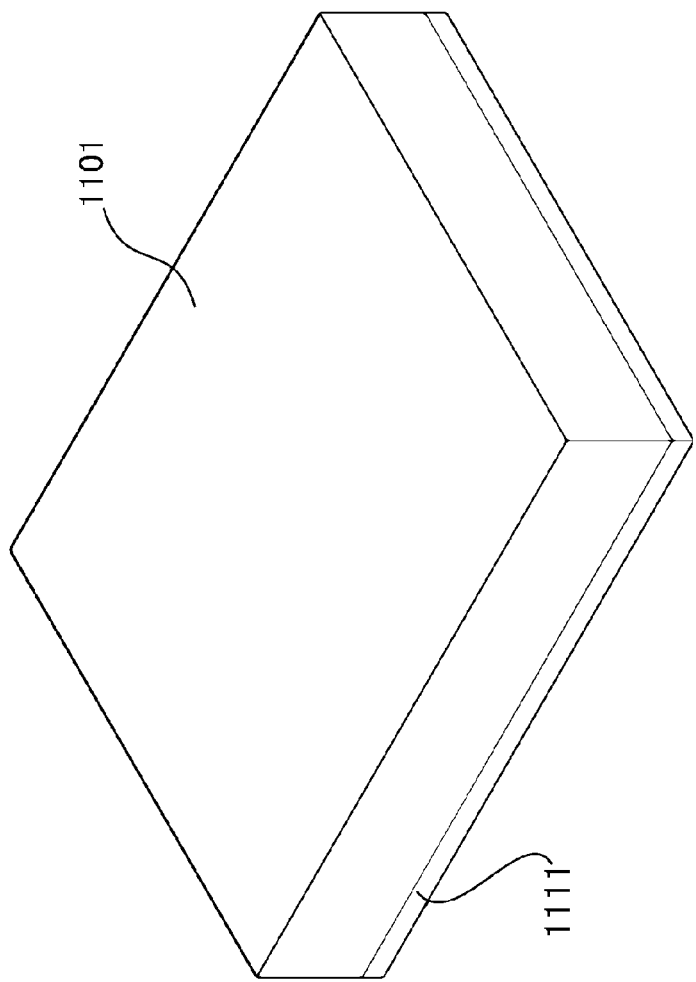
FIG. 5 is a schematic perspective view showing the process following FIG. 4 within the manufacturing process of the ultrasound transducer related to Embodiment 1.

The surfaces of the non-conductive material block 1101 and the electric conductive material block 1111 are overlapped together and connected. As shown in FIG. 5, these are connected to form an acoustic matching layer block. Furthermore, a subsequent process forms a split groove in a procession in both the non-conductive material block 1101 and the electric conductive material block 1111; thereby, as shown in FIG. 1, forming the intended element number and the same number of laminates.

Figure 6:
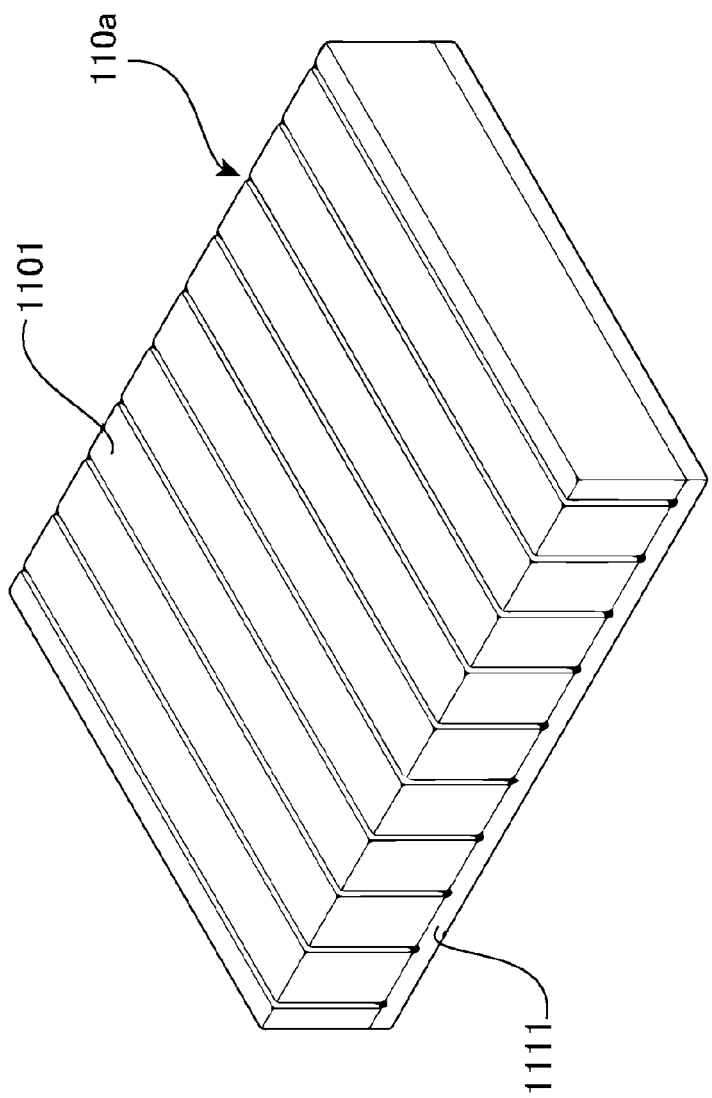
FIG. 6 is a schematic perspective view showing the process following FIG. 5 within the manufacturing process of the ultrasound transducer related to Embodiment 1.

<Forming Groove /FIG. 6>

After connecting the non-conductive material block 1101 and the electric conductive material block 1111, with respect to said acoustic matching layer block (after splitting the two-dimensional array (FIG. 8)), the groove 110*a* is provided with the desired pitch in columns or in rows (x direction or y direction in FIG. 1). That is, as shown in FIG. 6, the non-conductive material block 1101 is pierced from the opposite side of the connection surface on the non-conductive material block 1101 to form the groove 110*a* leading up to mid-way of the electric conductive material block 1111. Note that the "connection surface" refers to the connection surface with the electric conductive material block 1111.

Moreover, a plurality of groove 110*a* are provided by a pitch corresponding to the element pitch of the ultrasound transducer 100. In other words, when the grooves 110*a* are provided in columns in the element array, the grooves 110*a* at least as many as the columns are provided. Moreover, when the grooves 110*a* are provided in rows in the element array, the grooves 110*a* at least as many as the rows are provided. Note that the number of grooves 110*a* of the acoustic matching layer block in FIG. 6 is conceptually shown. Moreover, the groove 110*a* does not necessarily need to be provided parallel to the element array as shown in FIG. 6, and may be provided such that the grooves of respective elements are slanted towards the element array. Moreover, although the groove 110*a* shown in FIG. 6 is provided in parallel to the irradiation direction of the ultrasound wave (front-back direction of the element) of the ultrasound transducer 100, without limiting to such a configuration, for example, the grooves may be provided such that the groove depth changes in correspondence with the front-back direction of the element.

An example of the cutting depth of the electric conductive material block 1111 in forming the groove 110*a* is approximately 10 μm to the electric conductive material block 1111 with a thickness of 150 μm to 200 μm. Moreover, when the cutting width (width of the groove 110*a*) is 10 μm or more and approximately 30% or less of the element width, it is effective for the radiation performance of the ultrasound pulse, the vibration mode of the ultrasound transducer 100, and the formation process of the conductive film 11, etc. As an example of the cut-in width to the element width under such circumstances, having a width of 50 μm for the element width of 350 μm is considered. Moreover, the pitch of the cut-in width may be approximately 0.4 mm. Moreover, in order to reduce the thickness of the electric conductive acoustic matching layer 111 in the finished product of the ultrasound transducer 100, the following process is taken.

First, the acoustic matching layer block is formed in advance using the electric conductive material block 1111 thicker than the specified value (thickness of the electric conductive acoustic matching layer 111 of the finished product).

Next, the non-conductive material block 1101 is pierced as mentioned above, and the groove 110*a* leading up to mid-way of the electric conductive material block 1111 is provided.

Subsequently, the opposite side of the connection surface of the electric conductive material block 1111 in the acoustic matching layer block are cut or ground to achieve the desired thickness. Moreover, the amount of cut-in of the electric conductive material block 1111 is set in correspondence with the thickness reduced by this cutting or grinding.

<Conductive Film Shaping>

After the groove 110*a* is provided on the acoustic matching layer block as the laminate of the non-conductive material block 1101 and electric conductive material block 1111, the conductive film 110*b* is provided in the groove 110*a*. The conductive film 110*b* is, for example, provided throughout the entire inner surface of the groove 110*a* by plating, spattering, etc. Thereby, one end to the other end of the groove 110*a* is electrically conducted. Furthermore, the front surface electrode 112 adjacent to the non-conductive acoustic matching layer 110 is electrically conducted with the wiring pattern of the front substrate 122 via the conductive film 110*b* and electric conductive acoustic matching layer 111.

Moreover, the conductive film 110*b* does not necessarily have to be provided on the entire inner surface of the groove 110*a*. For example, the conductive film 110*b* may be provided such that it passes a portion on one side surface of the inner surfaces of the groove 110*a* from one end of the groove 110*a* (end of the back surface side) to the other end (end of the electric conductive acoustic matching layer 111). Moreover, if it is possible to provide the connecting lead with the groove 110*a* passed from the front surface electrode 112 to the electric conductive acoustic matching layer 111, the connecting lead may be provided instead of the conductive film 110*b*.

<Resin Filling>

After forming the conductive film 110*b* on the groove 110*a* of the acoustic matching layer block, the resin 110*c* is filled further inside the conductive film 110*b* of the groove 110*a*. An epoxy adhesive, etc., may be used for the resin 110*c*. However, depending on the figure of the element (laminate) and the vibration mode of the ultrasound transducer 100, sometimes there is little acoustic effect due to the groove 110*a*; in such cases, the resin 110*c* does not need to be provided. Moreover, when using the groove 110*a* as a subdie in order to suppress unnecessary vibration, the groove 110*a* corresponding to the subdie may be left as a gap, or a desired medium may be filled inside.

Figure 7:
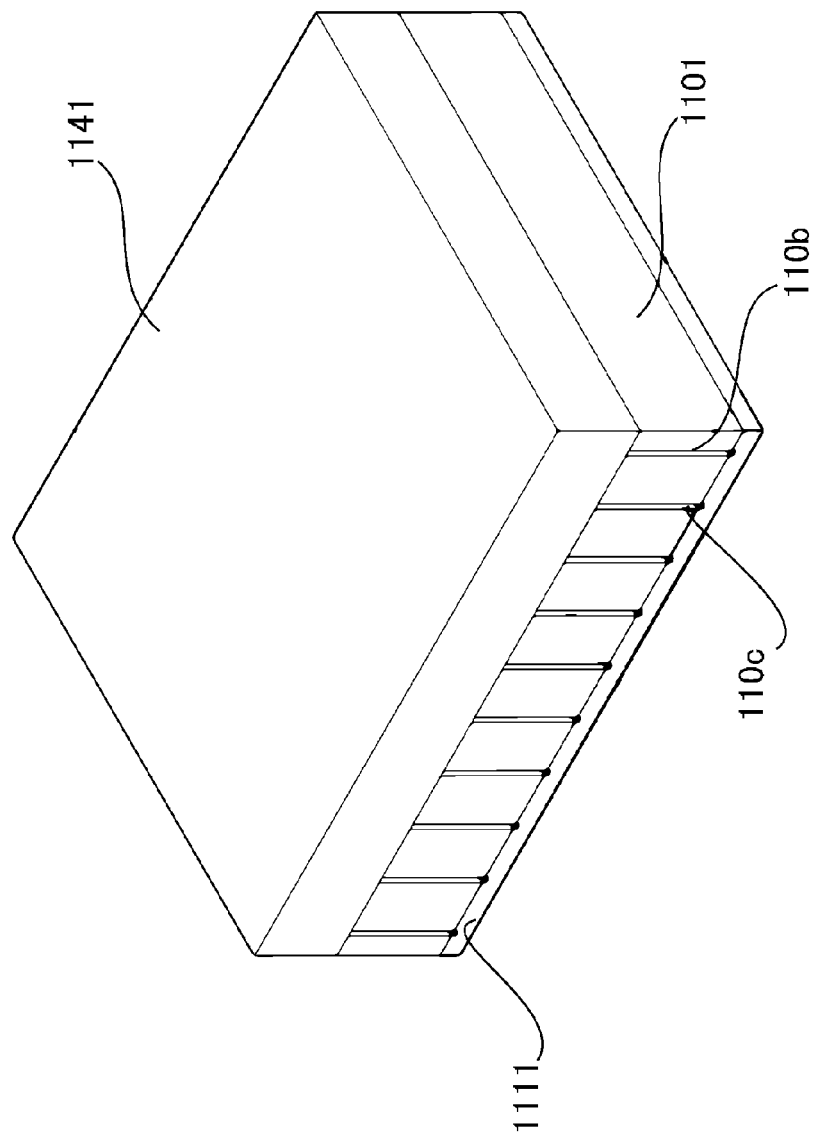
FIG. 7 is a schematic perspective view showing the process following FIG. 6 within the manufacturing process of the ultrasound transducer related to Embodiment 1.

<Piezoelectric Connection/FIG. 7>

After the groove 110*a* is provided to the acoustic matching layer block as the laminate of the non-conductive material block 1101 and the electric conductive material block 1111, and the conductive film 110*b* as well as the resin 110*c* are further provided, the acoustic matching layer block and the piezoelectrics material block 1141 are connected. That is, as shown in FIG. 7, the piezoelectrics material block 1141 is connected to the opposite side of the connection surface of the electric conductive material block 1111 in the non-conductive material block 1101. Moreover, it is assumed that a layer of the front surface electrode 112 is provided in advance on the front surface of the piezoelectrics material block 1141. In the same manner, it is assumed that a layer of a back surface electrode 116 is formed on the back surface of the piezoelectrics material block 1141. Moreover, the split grooves are formed in the piezoelectrics material block 1141 in a procession in a subsequent process, and are split such that the desired element number of piezoelectrics 114 is achieved as the ultrasound transducer 100 (refer to FIG. 1).

<Substrate Connection>

Figure 8:
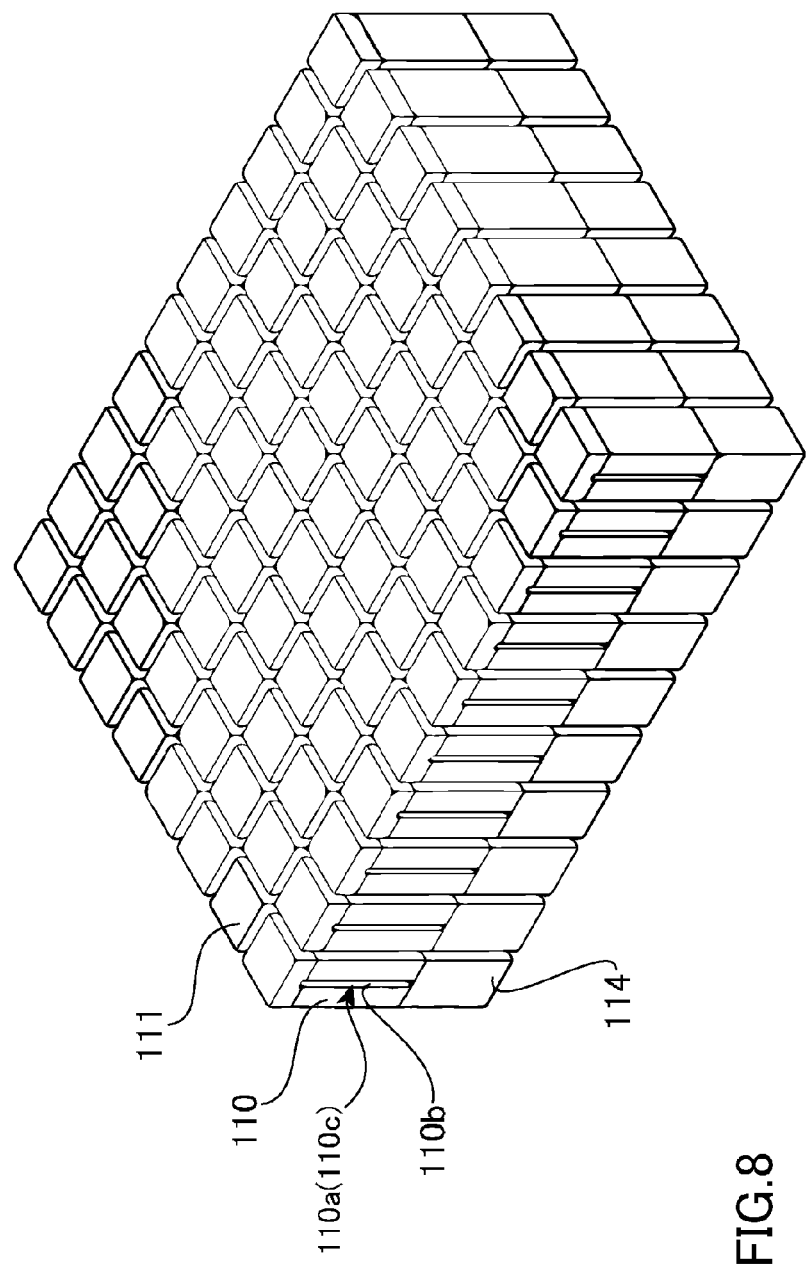
FIG. 8 is a schematic perspective view showing the process following FIG. 7 within the manufacturing process of the ultrasound transducer related to Embodiment 1.

As shown in FIG. 8, the rear substrate 120 is connected to the back surface of the back surface electrode 116 of the piezoelectrics 114.

Thereby, the wiring pattern of the rear substrate 120 and the back surface electrode 116 are electrically connected.

<Backing Material Connection>

After the substrate is connected to the back surface of an element group, the backing material 118 is connected to the back surface of the rear substrate 120. Moreover, regarding the configuration between the piezoelectrics 114, the rear substrate 120, and the backing material 118, without limitation to those shown in FIG. 1, structures such as an electrical circuit that process signals as necessary, a back surface matching layer, etc., may be interpositioned.

<Split Groove Formation/FIG. 8>

After connecting the backing material 118 to the back surface of the rear substrate 120, the split grooves are provided in a procession to the laminate. That is, as shown in FIG. 8, the split grooves are formed in a predetermined pitch in columns in the substrate direction of the acoustic matching layer block and the piezoelectrics material block 1141, and split into blocks with a plurality of columns. Furthermore, the split grooves are provided in a predetermined pitch in rows in the substrate direction of the acoustic matching layer block and the piezoelectrics material block 1141. As a result, the laminate of the piezoelectrics 114, the non-conductive acoustic matching layer 110, and the electric conductive acoustic matching layer 111 as in FIG. 8 are two-dimensionally arrayed and the element group is formed. Moreover, FIG. 8 is shown upside down with respect to FIGS. 4 to 7.

<Front Substrate Connection>

Next, the front substrate 122 is connected to the respective front surface of the electric conductive acoustic matching layer 111. Thereby, the wiring pattern of the front substrate 122 and respective electric conductive acoustic matching layers 111 are electrically connected.

<Acoustic Lens Connection>

After connecting the substrate to the front surface of the element group of the two-dimensional array, the acoustic lens 102 is connected to the front surface of the front substrate 122 at the same time or around the same time as the connection of the backing material 118. Moreover, as mentioned above, when configuring the acoustic matching layer with three layers or more, the acoustic matching layer may be arranged on the front surface of the acoustic lens 102. Moreover, the acoustic matching layer may be arranged on the front surface of the front substrate 122 without adjoining the front substrate 122 and the acoustic lens 102, and the acoustic lens 102 may be arranged on the further front surface of the acoustic matching layer.

(Connection of the Ultrasound Transducer and the External Device)

Next, an example of a connection configuration is set forth between the ultrasound probe comprising the ultrasound transducer 100 of Embodiment 1 and the ultrasound diagnostic equipment body. Moreover, illustrations are abbreviated in the following description. The ultrasound transducer 100 is provided inside the ultrasound probe, comprising an interface (cable, etc.) for electrically connecting the ultrasound diagnostic equipment body with the ultrasound probe. Moreover, the ultrasound transducer 100 is electrically connected to the ultrasound diagnostic equipment via a wiring pattern of the front substrate 122, a wiring pattern of the rear substrate 120, and the interface of the ultrasound probe, alternately transmitting signals related to the transmitting and receiving of the ultrasound wave.

Moreover, the circuit board provided with the electrical circuit such as the transmitter-receiver circuit, etc., and/or the connecting substrate that connects the interface with the electrical circuit may be provided inside the ultrasound probe. In this case, signals are transmitted and received between the front surface electrode 112 and/or back surface electrode 116 and the control of the ultrasound diagnostic equipment body via the interface connecting the ultrasound probe and the body, the wiring pattern of the connecting substrate, the electrical circuit, or the wiring pattern of the front substrate 122 and/or the rear substrate 120.

For example, the ultrasound diagnostic equipment body sends electrical signals related to a control of the drive of the ultrasound transducer 100 from the control thereof via the interface. These electrical signals are transmitted to the electric circuit of the circuit board via the connecting substrate. The electric circuit applies voltage to the piezoelectrics 114 via the front substrate 122 and the rear substrate 120 based on signals from the ultrasound diagnostic equipment body. Voltage is applied to the piezoelectrics 114 in this manner and the ultrasound pulse is transmitted to the test object.

Moreover, for example, when the ultrasound transducer 100 receives reflected waves from the test object, it transmits the electric signals converted by the piezoelectrics 114 to the electric circuit via the rear substrate 120, etc. The electric circuit conducts predetermined processing (adding delays, amplifying, etc.) to these electric signals and furthermore, transmits the electric signals to the control of the ultrasound diagnostic equipment body via the connecting substrate and the interface. Based on these electric signals, the ultrasound diagnostic equipment generates an ultrasound image. Moreover, electric signals are transmitted between the electric circuit and the front surface electrode through the wiring pattern of the front substrate 122 as well as the groove 110a of the electric conductive acoustic matching layer 111 and the non-conductive acoustic matching layer 110.

(Function/Effect)

The function and effect of the ultrasound transducer 100 and the ultrasound probe related to Embodiment 1 described above are set forth.

As described above, in the ultrasound transducer 100 of Embodiment 1, in each of the non-conductive acoustic matching layers 110 arranged in front of the piezoelectrics 114, the groove 110a is provided penetrating from the boundary surface with the front surface electrode 112 leading up to at least the boundary surface with the electric conductive acoustic matching layer 111. Furthermore, this groove 110a does not stop at the front surface of the non-conductive acoustic matching layer 110, but is continuous to mid-way of the electric conductive acoustic matching layer 111. That is, as shown in FIG. 3A, the groove 110a is provided leading up to mid-way of the electric conductive acoustic matching layer 111 from the back surface of the non-conductive acoustic matching layer 110 via the front surface of the electric conductive acoustic matching layer 111. Moreover, the conductive film 110b is provided passing the area leading up to the electric conductive acoustic matching layer 111 from at least the end of the back surface side (rear end of the groove 110a) of the non-conductive acoustic matching layer 110 of the inner surface of the groove 110a.

Regarding the manufacturing process of the ultrasound transducer 100 comprising this non-conductive acoustic matching layer 110, the conductive path from the front surface electrode 112 to the front substrate 122 may be provided by the following procedure alone. That is, the non-conductive material block 1101 and the electric conductive material block 1111 are layered, then, the grooves 110a corresponding to the number of columns or number of rows are formed in columns or rows of the element following splitting of the two-dimensional array, the piezoelectrics material block 1141 is connected, and subsequently, the split grooves are provided in processions with respect to said laminate, thereby forming the two-dimensional array of the element configured by comprising piezoelectrics 114 and the laminate of the non-conductive acoustic matching layer 110 as well as the electric conductive acoustic matching layer 111.

The ultrasound transducer 100 manufactured by such a manufacturing process allows the complication of forming the conductive path of the non-conductive acoustic matching layer 110 and the complication of the manufacturing process of the ultrasound transducer 100 to be avoided and allows forming of the conductive path from the front surface electrode 112 to the front substrate 122 to be achieved. That is, if the configuration comprises the groove 110a and the conductive film 110b leading up to mid-way of the electric conductive acoustic matching layer 111, the conductive path from the front surface electrode 112 to the electric conductive acoustic matching layer 111 may be surely formed in the manufacturing process, and in addition, layering the piezoelectrics material block 1141 after providing the groove 110a to the acoustic matching layer block is enough for the process of forming the conductive path and is simple.

[Embodiment 2]

Figure 9:
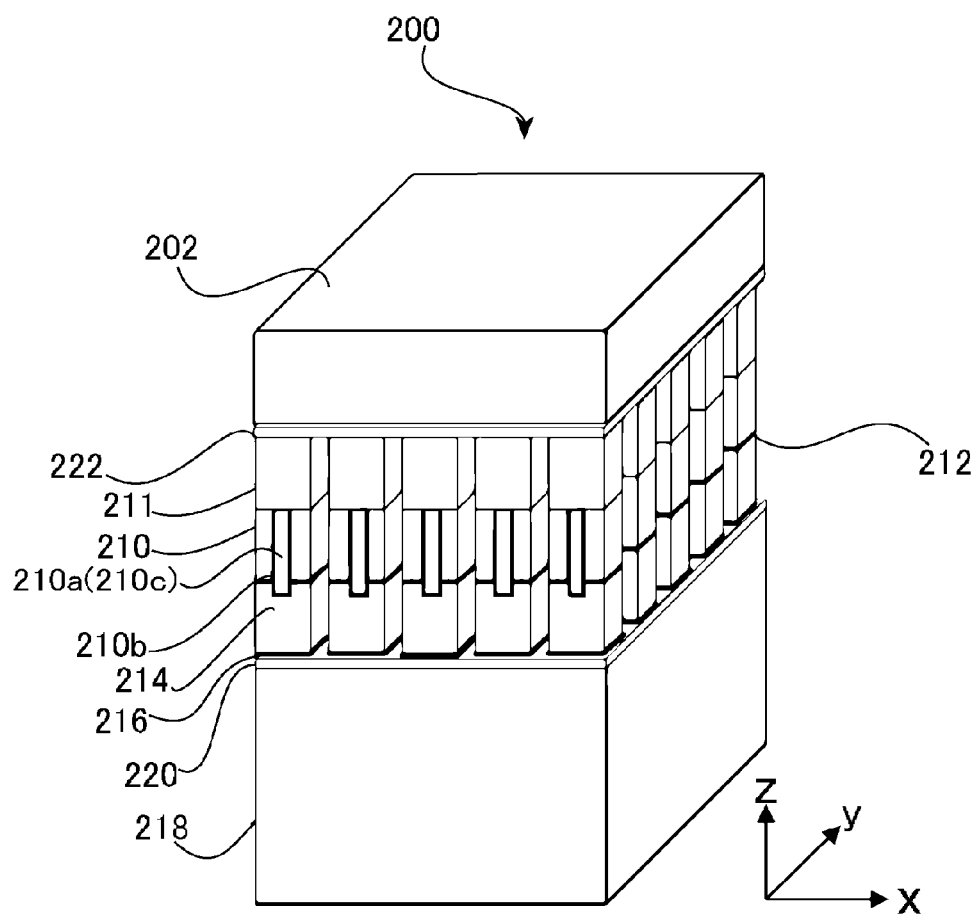
FIG. 9 is a showing the outline of the ultrasound transducer related to Embodiment 2.

Next, the ultrasound transducer 200 and the ultrasound probe provided with the ultrasound transducer 200 related to Embodiment 2 are set forth with reference to FIGS. 9 to 16. FIG. 9 is a schematic perspective view showing the abstract of the ultrasound transducer 200 related to Embodiment 2. Moreover, some features in Embodiment 2 different from Embodiment 1 are mainly set forth, while descriptions on other common features sometimes are omitted. Moreover, the element number of the ultrasound transducer 200 shown in FIG. 9 is conceptually shown. Moreover, the number of columns and rows is only one example, with other configurations able to be applied.

(Schematic Configuration of the Ultrasound Transducer)

As shown in FIG. 9, in the ultrasound transducer 200 related to Embodiment 2 as well, the piezoelectrics 214 are two-dimensionally arranged on the xy surface. The front surface electrode 212 is arranged on the front surface side, while the back surface electrode 216 is provided on the back surface side of said piezoelectrics 214. Moreover, the non-conductive acoustic matching layer 210 is provided in correspondence with each front surface of the respective piezoelectrics 214. Furthermore, the electric conductive acoustic matching layer 211 is provided on the front surface side of the non-conductive acoustic matching layer 210. Moreover, the backing material 218 is provided on the back surface side of the piezoelectrics 214, while the rear substrate 220 is provided between the backing material 218 and the piezoelectrics 214. Moreover, as shown in FIG. 9, the front substrate 222 is provided on the front surface side of the electric conductive acoustic matching layer 211. Moreover, the acoustic lens 202 is provided further on the front surface side of the front substrate 222. Moreover, in the same manner as FIG. 1, illustrations of the front substrate 222 and the rear substrate 220 are also partially omitted in FIG. 9.

(Configuration of the Non-Conductive Acoustic Matching Layer and Piezoelectrics)

Figure 10:
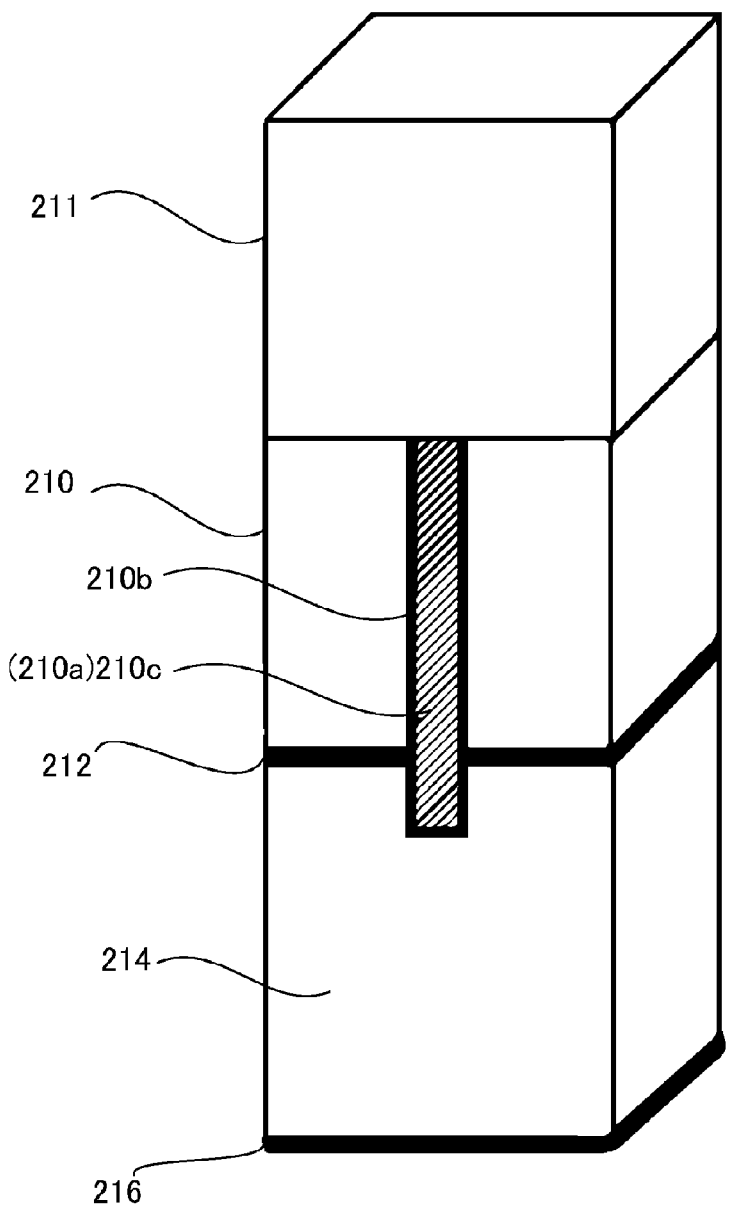
FIG. 10 is a schematic perspective view showing the laminates of the acoustic matching layer and the piezoelectric bodies related to Embodiment 2.
Figure 11A:
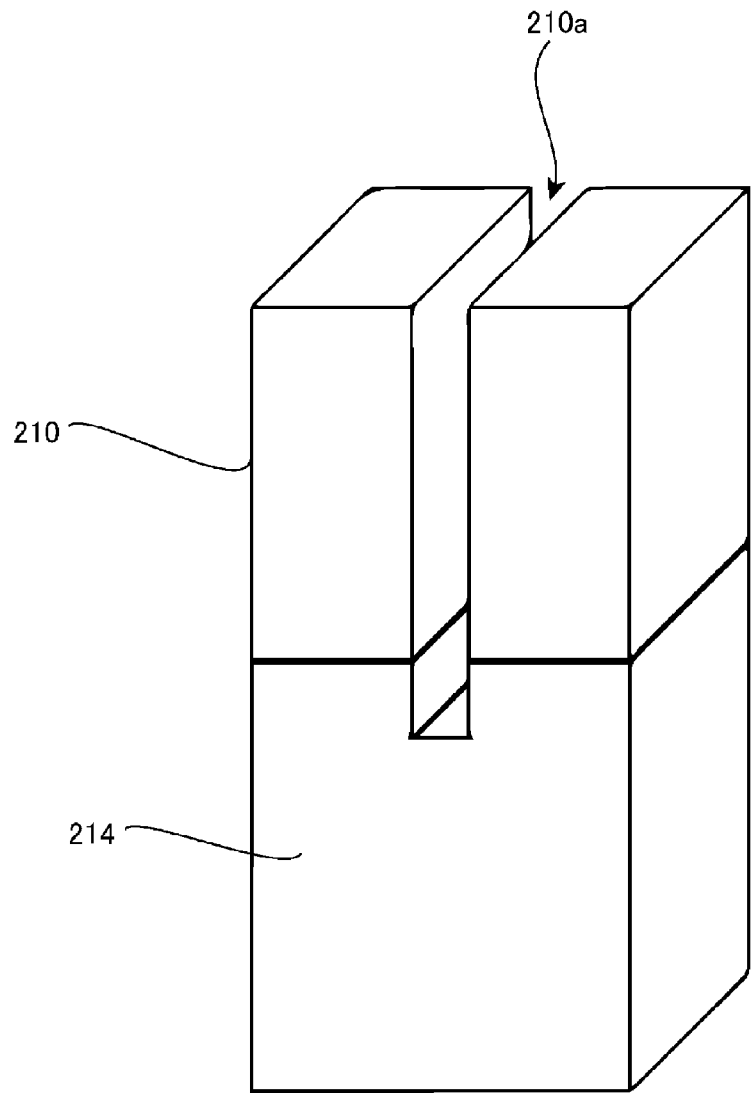
FIG. 11A is a schematic perspective view showing the groove in the laminate of the non-conductive acoustic matching layer and the piezoelectric bodies related to Embodiment 2.
Figure 11B:
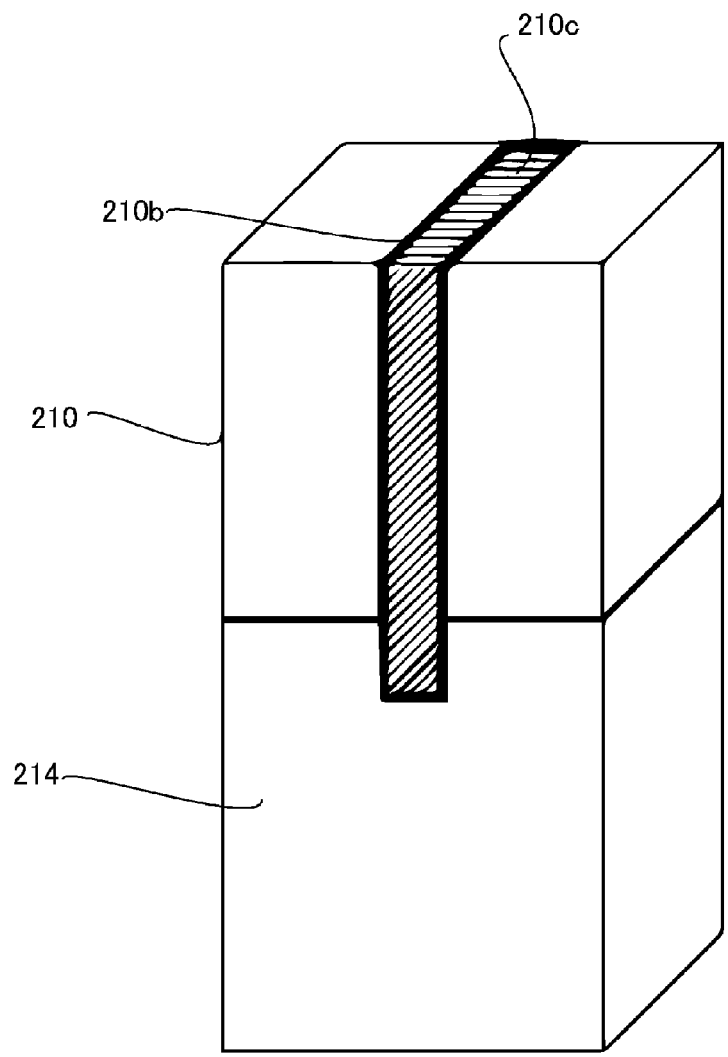
FIG. 11B is a schematic perspective view showing the resin filling the groove of FIG. 11A.

Next, with reference to FIG. 10, FIG. 11A and FIG. 11B, the non-conductive acoustic matching layer 210 and the piezoelectrics 214 in the ultrasound transducer 200 of Embodiment 2 are described. FIG. 10 is a schematic perspective view showing the laminate of the acoustic matching layer (211, 210) and the piezoelectrics 214 related to Embodiment 2. FIG. 11A is a schematic perspective view showing the groove 210a of the laminate comprising the non-conductive acoustic matching layer 210 and the piezoelectrics 214 related to Embodiment 2. FIG. 11B is a schematic perspective view showing the resin 210c filling the groove 210a of FIG. 11A.

The conductive path (groove 210a) between the front surface electrode 212 and the electric conductive acoustic matching layer 211 related to Embodiment 2 are, as shown in FIG. 10, provided from the front surface of the non-conductive acoustic matching layer 210 to mid-way of the piezoelectrics 214. That is, as shown in FIG. 11A, the groove 210a penetrates from the boundary surface with the electric conductive acoustic matching layer 211 in the non-conductive acoustic matching layer 210 (front surface of the non-conductive acoustic matching layer 210) to the non-conductive acoustic matching layer 210, and penetrates the front surface of the piezoelectrics 214 via the boundary surface with the front surface electrode 212 (back surface of the non-conductive acoustic matching layer 210), leading up to mid-way of the piezoelectrics 214. Here, "mid-way of the piezoelectrics 214" indicates, for example, a location from the front surface of the piezoelectrics 214 with a thickness of 400 µm to 550 µm leading to the rear location by approximately 10 µm (opposite direction as the z direction of FIG. 9) (base of the groove 210a).

Moreover, the groove 210a of Embodiment 2 is provided reaching from one side of the element array direction (in a column or row/x or y direction of FIG. 9) to the other side on the opposite side. That is, the groove 210a is provided by penetrating the non-conductive acoustic matching layer 210 and the piezoelectrics 214 in the element array direction. According to such a configuration of the groove 210a, the groove 210a may be provided once to each element belonging to one column or one row of the element array (refer to FIG. 14 to FIG. 16), in order to form the groove 210a with respect to each element (the laminate of the non-conductive acoustic matching layer 210 and piezoelectrics 214). Moreover, the element array direction is the direction perpendicular to the front-back direction of the ultrasound transducer 200. Moreover, if the groove may be provided at once to each element belonging to one column or one row, the element (laminate) located on both ends of the element array direction does not need to penetrate in the element array direction.

Moreover, the conductive film 210b is provided inside the groove 210a in the laminate of the non-conductive acoustic matching layer 210 and the piezoelectrics 214 shown in FIG. 11A throughout the entire surface thereof by plating, spattering, etc. The groove 210a is provided up to mid-way of the piezoelectrics 214 from the front surface of the non-conductive acoustic matching layer 210 via the front surface electrode 212 and the front surface of the piezoelectrics 214, while the conductive film 210b continues from the front surface of the non-conductive acoustic matching layer 210 leading to the electric conductive acoustic matching layer 211. That is, the conductive film 210b covers the entire surface of the groove 210a; therefore, one end to the other end of the groove 210a is electrically conducted. As a result, the front surface electrode 212 contacts the rear side of the conductive film 210b and is conducted with the electric conductive acoustic matching layer 211 contacting the front surface of the non-conductive acoustic matching layer 210. Furthermore, the front surface electrode 212 is conducted with the connecting lead of the front substrate 222 via the electric conductive acoustic matching layer 211.

Moreover, as shown in FIG. 11B, in Embodiment 2 as well, the resin 210c is filled further inside the conductive film 210b of the groove 210a in the non-conductive acoustic matching layer 210 and the electric conductive acoustic matching layer 211. This filling of the resin 210c allows the effect from providing the groove 210a in the non-conductive acoustic matching layer 210 to be suppressed. However, depending on the figure of the element (laminate) and/or the vibration mode of the ultrasound transducer 200, sometimes the acoustic effect due to the groove 210a of the acoustic matching layer is small, and in such cases, the resin 210c does not need to be provided.

Moreover, when using the groove 210a as a subdie, the groove 210a may be left as a gap, or may be filled with the desired medium. Moreover, the front surface electrode 212 and the electric conductive acoustic matching layer 211 may be conducted; therefore, for example, within the inside of the groove 210a, the conductive film 210b may be partially provided so as to pass from the front surface end of the non-conductive acoustic matching layer 210 to the piezoelectrics 214. Moreover, if the connecting lead may be provided, adopting such a configuration is also possible.

Moreover, without limiting to the configuration illustrated in FIGS. 9 to 11A and FIG. 11B, a plurality of grooves 210a may be provided.

Moreover, there may be three or more acoustic matching layers, and for example, the acoustic matching layer may be provided in front of the front substrate 222. Moreover, the optimal width of the groove 210a (array-wise length/ x- or y-wise length of FIG. 9) is the same as in Embodiment 1.

(Abstract of the Manufacturing Method Of The Ultrasound Transducer)

Next, with reference to FIGS. 12 to 16, the manufacturing method of the ultrasound transducer 100 related to Embodiment 2, particularly the procedure of providing the groove 210a in the non-conductive acoustic matching layer 210 and the piezoelectrics 214, is primarily set forth. FIGS. 12 to 16 are schematic perspective views showing the manufacturing process of the ultrasound transducer 200 related to Embodiment 2.

Figure 12:
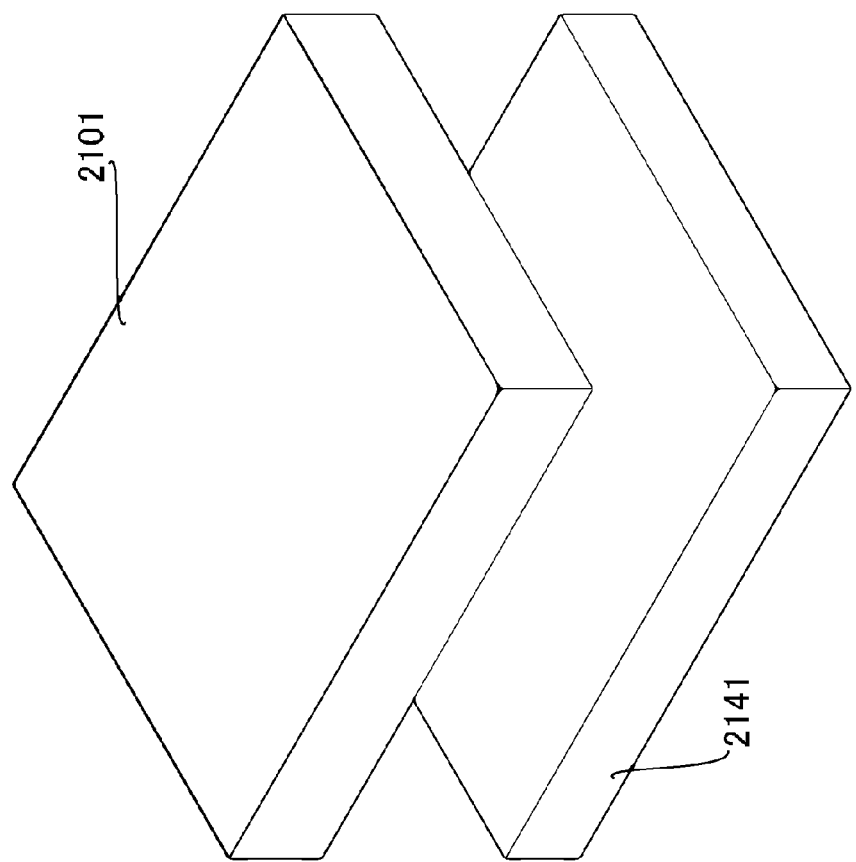
FIG. 12 is a schematic perspective view showing a part of the manufacturing process of the ultrasound transducer related to Embodiment 2.
Figure 13:
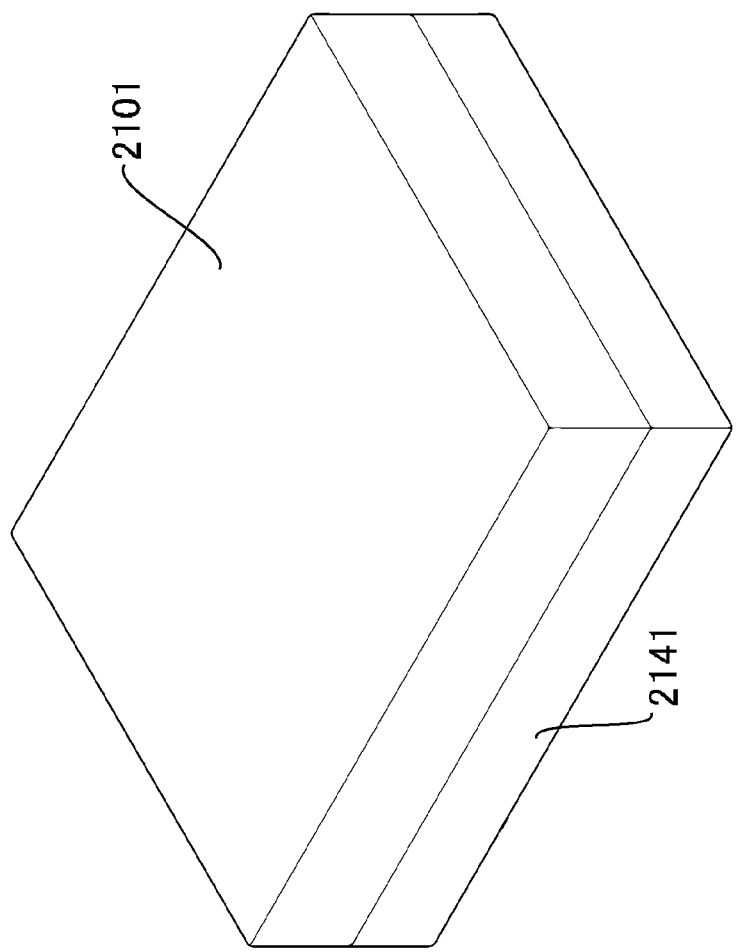
FIG. 13 is a schematic perspective view showing the process following FIG. 12 within the manufacturing process of the ultrasound transducer related to Embodiment 2.

<Block Connection/FIG. 12/ FIG. 13>

As illustrated in FIGS. 9 to 11A and FIG. 11B, the acoustic matching layer in the ultrasound transducer 200 of Embodiment 2 is configured by layering the non-conductive acoustic matching layer 210 and the electric conductive acoustic matching layer 211. However, in Embodiment 2, the non-conductive material block 2101 and the piezoelectrics material block 2141 are layered as shown in FIG. 12 before forming such a layered acoustic matching layer. Moreover, it is assumed that the layer of the front surface electrode 212 is formed in advance on the front surface of the piezoelectrics material block 2141. In the same manner, it is assumed that the layer of the back surface electrode 216 is formed in advance on the back surface of the piezoelectrics material block 2141.

That is, as shown in FIG. 13, first, the surfaces of the non-conductive material block 2101 and the piezoelectrics material block 2141 are overlapped and connected. Furthermore, in the subsequent procedure, the split groove is provided to each of these laminates in procession (x or y direction in FIG. 9), and thereby, laminates of the same number as the elements of the piezoelectrics 214 shown in FIG. 9 are formed.

Figure 14:
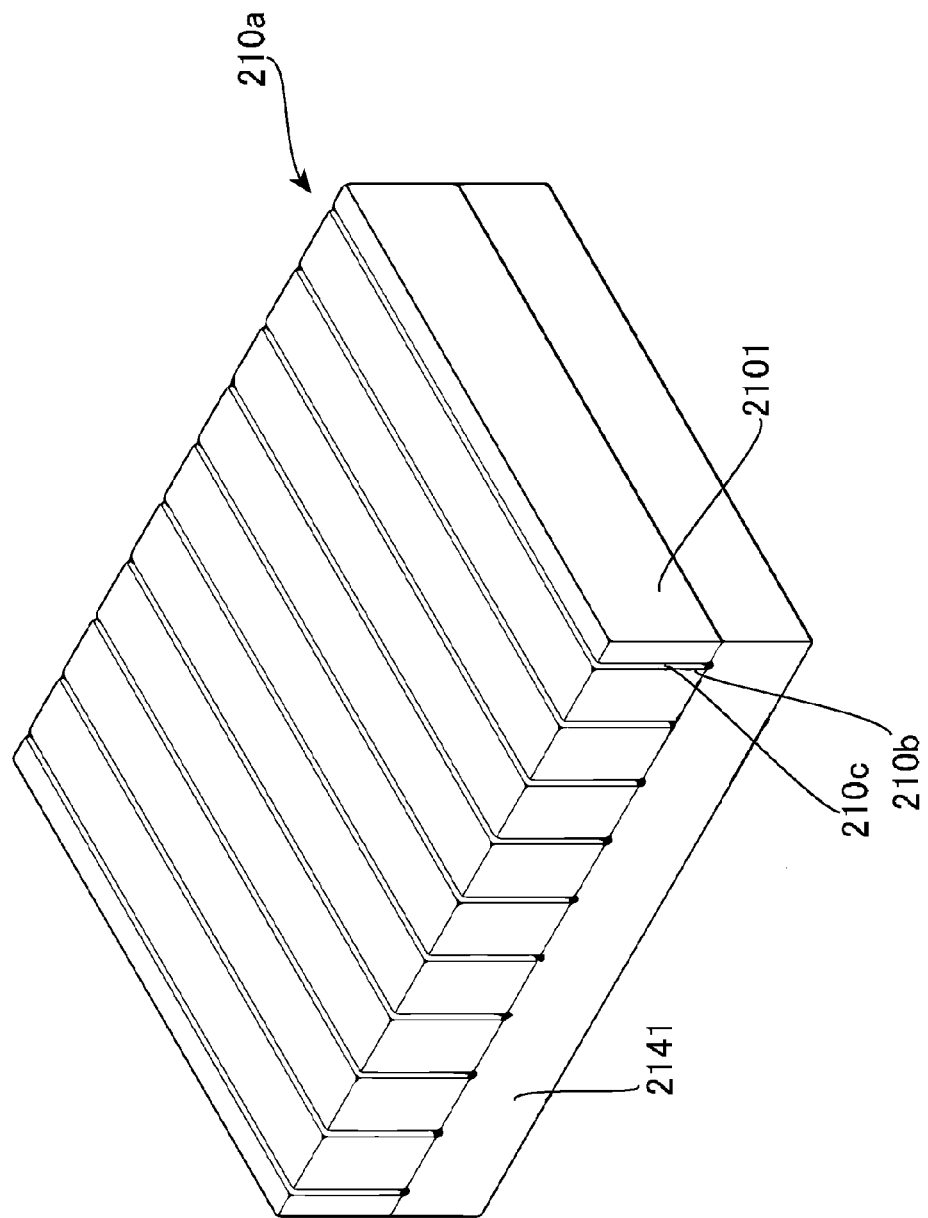
FIG. 14 is a schematic perspective view showing the process following FIG. 13 within the manufacturing process of the ultrasound transducer related to Embodiment 2.

<Groove Forming/FIG. 14>

After connecting the non-conductive material block 2101 and the piezoelectrics material block 2141, the groove 210a is provided in the laminate thereof. That is, as shown in FIG. 14, the groove 210a is provided from the other side of the connecting surface (front surface of the non-conductive material block 2101) in the non-conductive material block 2101 (front surface of the non-conductive material block 2101) up to mid-way of the piezoelectrics material block 2141, to penetrate the non-conductive material block 2101. Moreover, the "connection surface" indicates the connection surface with the piezoelectrics material block 2141.

In the same manner as Embodiment 1, a plurality of these grooves 210a are provided in a pitch corresponding to the element pitch of the ultrasound transducer 200. Moreover, the number of grooves 210a of the acoustic matching layer block in FIG. 14 is conceptually shown. Moreover, the groove 210a does not necessarily need to be parallel to the element array as shown in FIG. 14, and may be provided such that the grooves of respective elements are slanted towards the element array.

As an example, the amount of cut-in of the piezoelectrics material block 2141 in providing the groove 210a is approximately 10 μm to the piezoelectrics material block 2141 with a thickness of 400 μm to 550 μm. Moreover, in providing the groove 210a, when the cutting width is approximately 30% or less of the element width and 10 μm or more, it is effective for the radiation performance of the ultrasound pulse, the vibration mode of the ultrasound transducer 200, and the formation process of the conductive film 210b, etc.

Moreover, the forming process of the conductive film 210b and the forming process of the resin 210c of Embodiment 2 are the same as in Embodiment 1, so descriptions are omitted.

Figure 15:
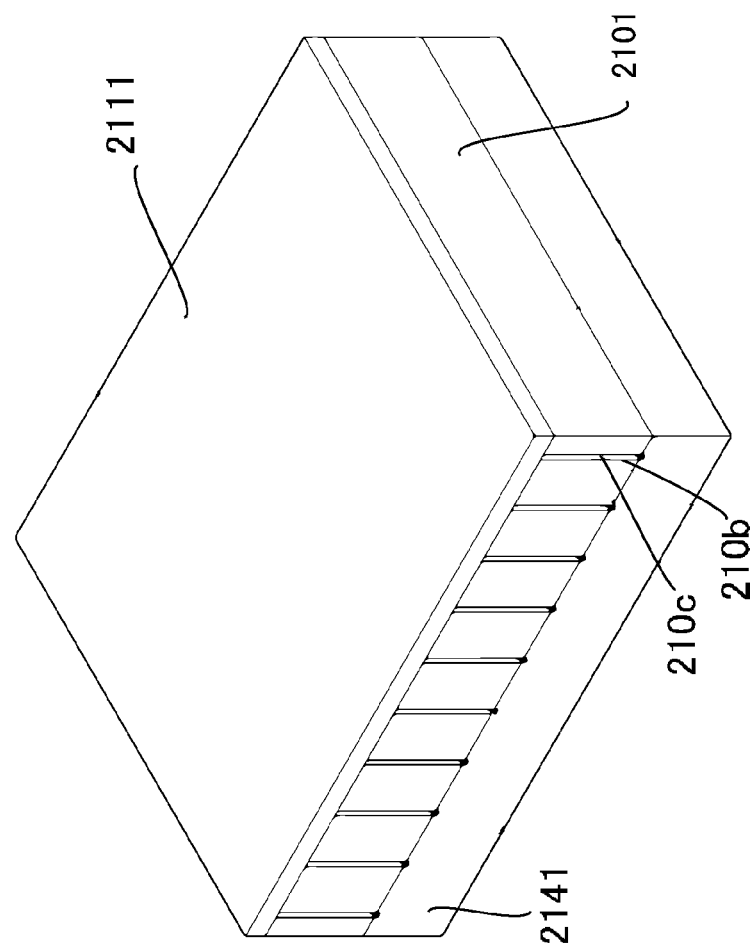
FIG. 15 is a schematic perspective view showing the process following FIG. 14 within the manufacturing process of the ultrasound transducer related to Embodiment 2.

<Electric Conductive Acoustic Matching Layer Connection/ FIG. 15>

After forming the groove 210a in the laminate of the non-conductive material block 2101 and the piezoelectrics material block 2141, the acoustic matching layer block thereof and the piezoelectrics material block 2141 are connected. That is, as shown in FIG. 15, the electric conductive material block 2111 is connected to the opposite side (front surface of the non-conductive material block 2101) of the connection surface with the piezoelectrics material block 2141 in the non-conductive material block 2101.

Figure 16:
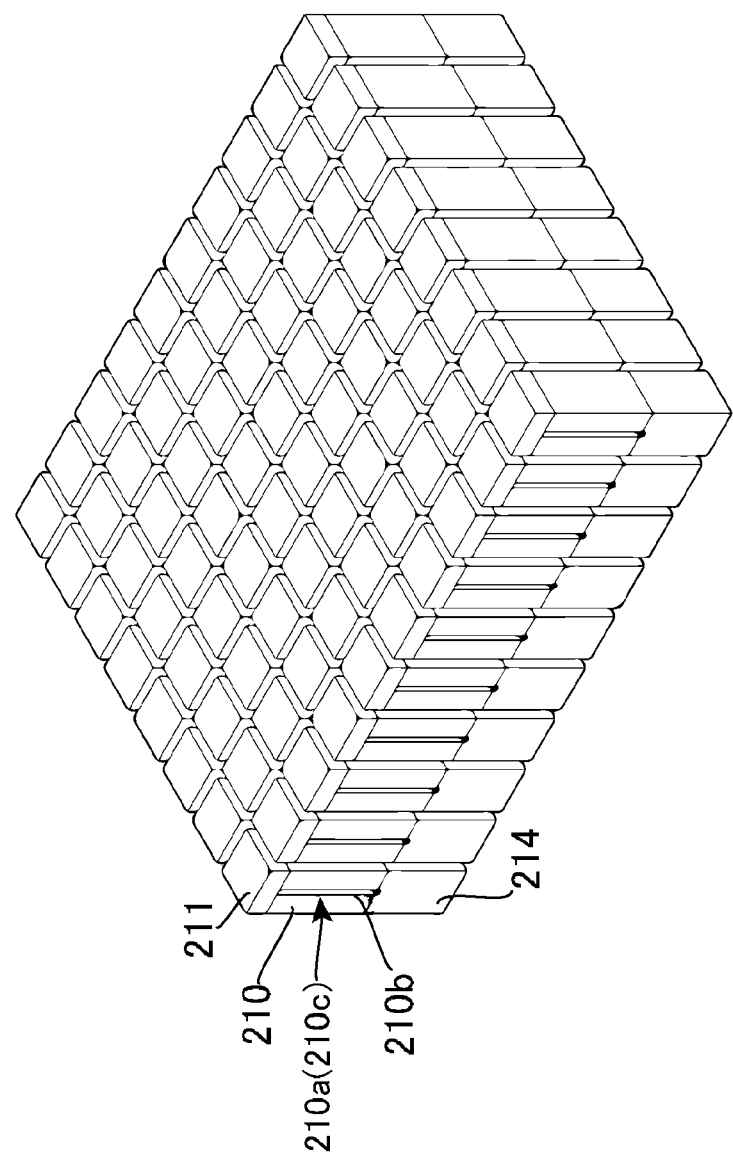
FIG. 16 is a schematic perspective view showing the process following FIG. 15 within the manufacturing process of the ultrasound transducer related to Embodiment 2.

<Split Groove Forming/FIG. 16>

After connecting the laminate of the non-conductive material block 2101 and the piezoelectrics material block 2141 to the electric conductive material block 2111, the split groove is provided in procession with respect to the laminate. As a result, the element group is configured by two-dimensionally arranging the laminate of the piezoelectrics 214, the non-conductive acoustic matching layer 210, and the electric conductive acoustic matching layer 211 as in FIG. 16.

Moreover, the connecting procedure of the front substrate 222 and the rear substrate 220, the connecting procedure of the backing material 218, and the connecting procedure of the acoustic lens 202 of Embodiment 2 are the same as in Embodiment 1, so descriptions are omitted.

(Function/Effect)

The function and effect of the ultrasound probe including the ultrasound transducer 200 related to Embodiment 2 described above is set forth.

As described above, in the ultrasound transducer 200 of Embodiment 2, each of the non-conductive acoustic matching layers 210 arranged in front of the piezoelectrics 214 is provided with the groove leading from the boundary surface with the electric conductive acoustic matching layer 211 to the boundary surface with the piezoelectrics 214, that is, the groove 210a penetrating the non-conductive acoustic matching layer 210. Furthermore, this groove 210a continues up to mid-way of the piezoelectrics 214, and not only the front surface of the piezoelectrics 214. That is, as shown in FIG. 11A, the groove 210a is provided from mid-way of the piezoelectrics 214 leading up to the front surface of the electric conductive acoustic matching layer 211 via the non-conductive acoustic matching layer 210. Moreover, inside the groove 210a, the conductive film 210b is provided from at least the mid-way of the piezoelectrics 214 (rear end of the groove 210a) up to the electric conductive acoustic matching layer 211 via the non-conductive acoustic matching layer 210.

The manufacturing process of the ultrasound transducer 200 having such non-conductive acoustic matching layer 210 requires only the following procedure alone to form the conductive path from the front surface electrode 212 to the front substrate 222: layering the non-conductive material block 2101 and the piezoelectrics material block 2141; forming the grooves 210a as many as columns or rows in the direction of columns or rows of the element after splitting of the two-dimensional array; subsequently connecting the electric conductive material block 2111; and subsequently, providing the split grooves to these laminates in processions, thereby forming the two-dimensional array of the elements having piezoelectrics 214 and the laminate of the non-conductive acoustic matching layer 210 as well as the electric conductive acoustic matching layer 111.

The ultrasound transducer 200 manufactured by such a manufacturing process allows the complication of forming the conductive path of the non-conductive acoustic matching layer 210 and the complication of the manufacturing process of the ultrasound transducer 200 to be avoided and achieves forming of the conductive path from the front surface electrode 212 to the front substrate 222.

That is, the configuration comprising the groove 210a and the conductive film 210b leading up to mid-way of the piezoelectrics 214 allows the conductive path from the front surface electrode 212 to the electric conductive acoustic matching layer 211 to be surely formed, and in addition, the process of forming the groove 210a involves layering the conductive material block 2111 after forming the groove 210a in the laminate of the non-conductive material block 2101 and the piezoelectrics material block 2141, making it simple.

[Embodiment 3]

Figure 17:
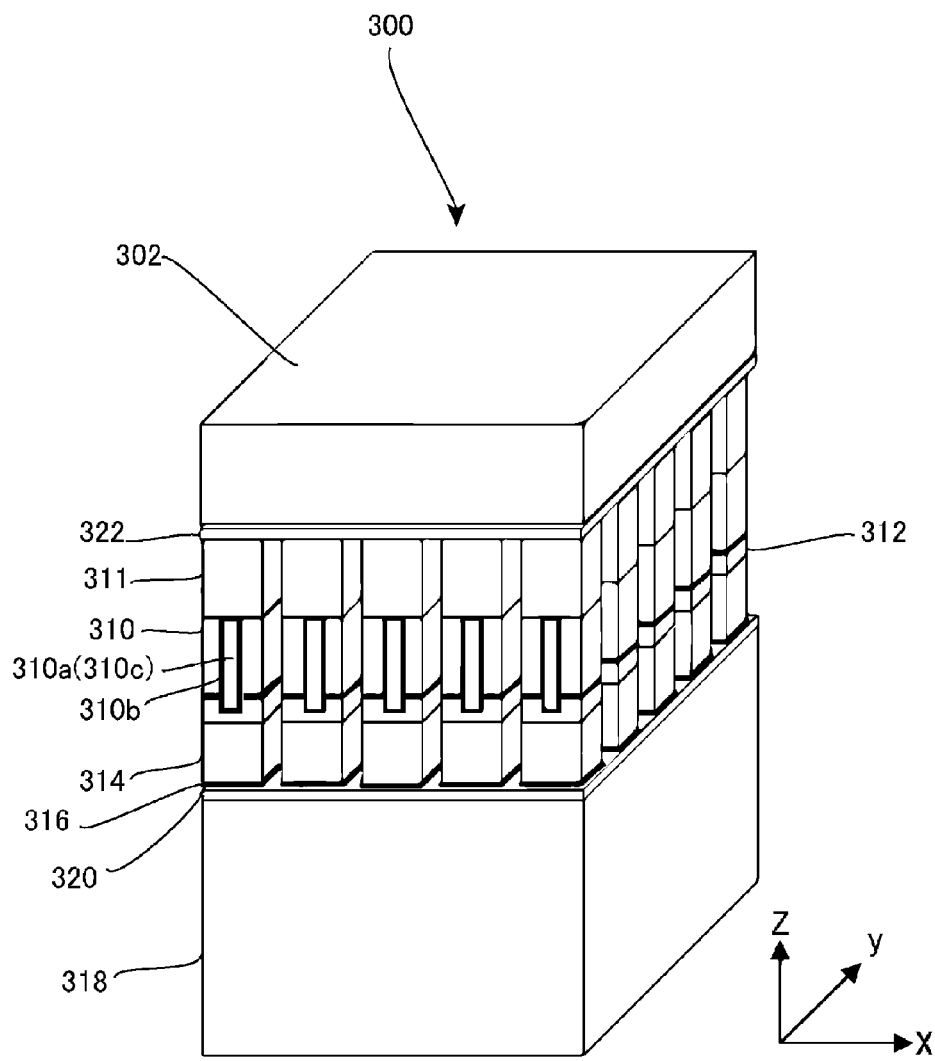
FIG. 17 is a schematic perspective view showing the outline of the ultrasound transducer related to Embodiment 3.

Next, the ultrasound transducer 300 and the ultrasound probe provided with the ultrasound transducer 300 related to Embodiment 3 is set forth with reference to FIGS. 17 to 24. FIG. 17 is a schematic perspective view showing the abstract of the ultrasound transducer 300 related to Embodiment 3. Moreover, regarding Embodiment 3, features different from Embodiment 1 and Embodiment 2 are mainly set forth, with descriptions of other overlapping areas sometimes omitted. Moreover, the element number of the ultrasound transducer 300 shown in FIG. 17 is conceptually. Moreover, the column number and the row number is only one example, with other configurations able to be applied.

(Schematic Configuration of the Ultrasound Transducer)

As shown in FIG. 17, in the ultrasound transducer 300 related to Embodiment 3 as well, the piezoelectrics 314 are two-dimensionally arranged on the xy surface, with the front surface electrode 312 as well as the back surface electrode 316 provided. Moreover, each front surface of the respective piezoelectrics 314 are provided with the non-conductive acoustic matching layer 310, the electric conductive acoustic matching layer 311, the front substrate 322, and the acoustic lens 302 in order towards the front. Moreover, the backing material 318 is provided on the back surface side of the piezoelectrics 314, while the rear substrate 320 is provided between the backing material 318 and the piezoelectrics 314. Moreover, in the same manner as in FIG. 1, illustrations of the front substrate 322 and the rear substrate 320 are partially omitted in FIG. 17.

(Configuration of the Front Surface Electrode)

The front surface electrode 312 of Embodiment 3 is formed thicker than the front surface electrode 112 and the front surface electrode 212 of Embodiment 1 and Embodiment 2. For example, when the thickness of the front surface electrode 112 of Embodiment 1 and the front surface electrode 212 of Embodiment 2 is approximately 1 m, the thickness of this front surface electrode 312 is approximately 20 µm. The front surface electrode 312 is formed thick in this manner because, as mentioned in the following, the groove 310a is provided mid-way of the front surface electrode 312 in this embodiment.

(Configuration between the Non-Conductive Acoustic Matching Layer, the Front Surface Electrode, and the Piezoelectrics)

Figure 18:
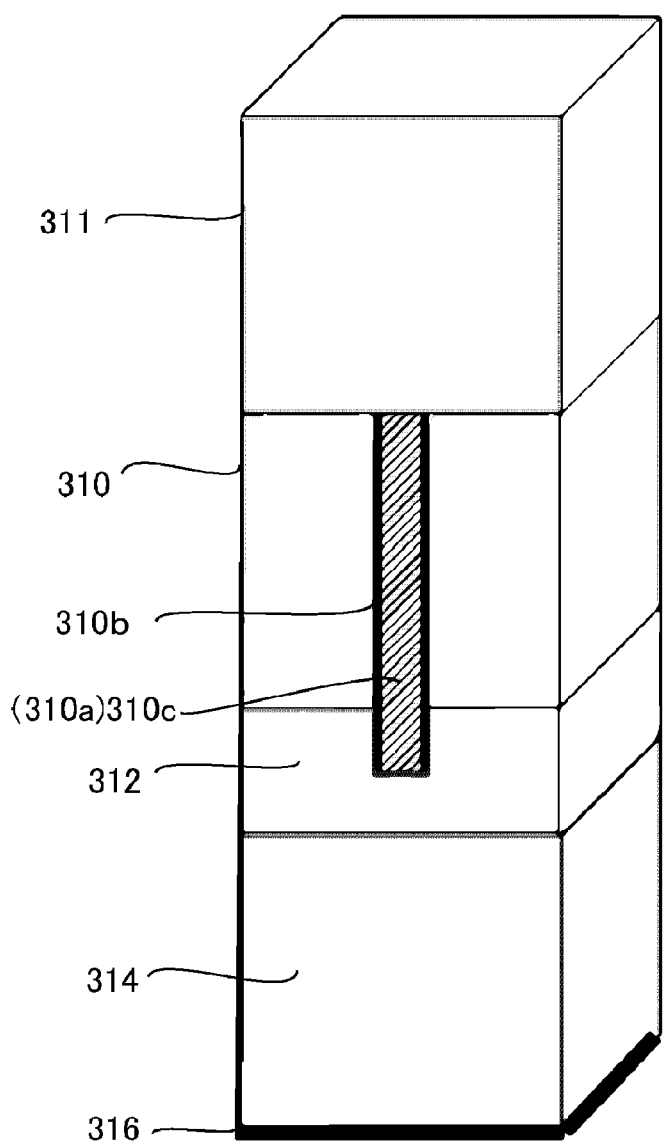
FIG. 18 is a schematic perspective view showing the laminates of the acoustic matching layer and the piezoelectric bodies related to Embodiment 3.
Figure 19A:
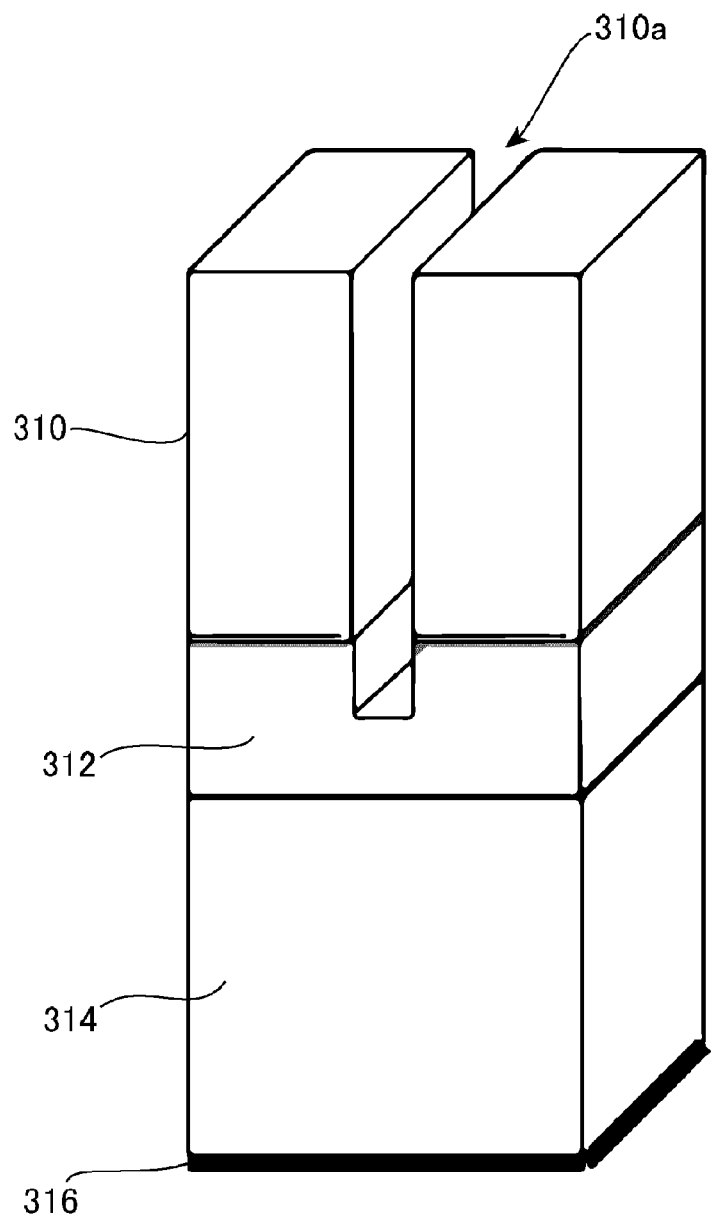
FIG. 19A is a schematic perspective view showing the groove in the laminate of the non-conductive acoustic matching layer and the piezoelectric bodies related to Embodiment 3.
Figure 19B:
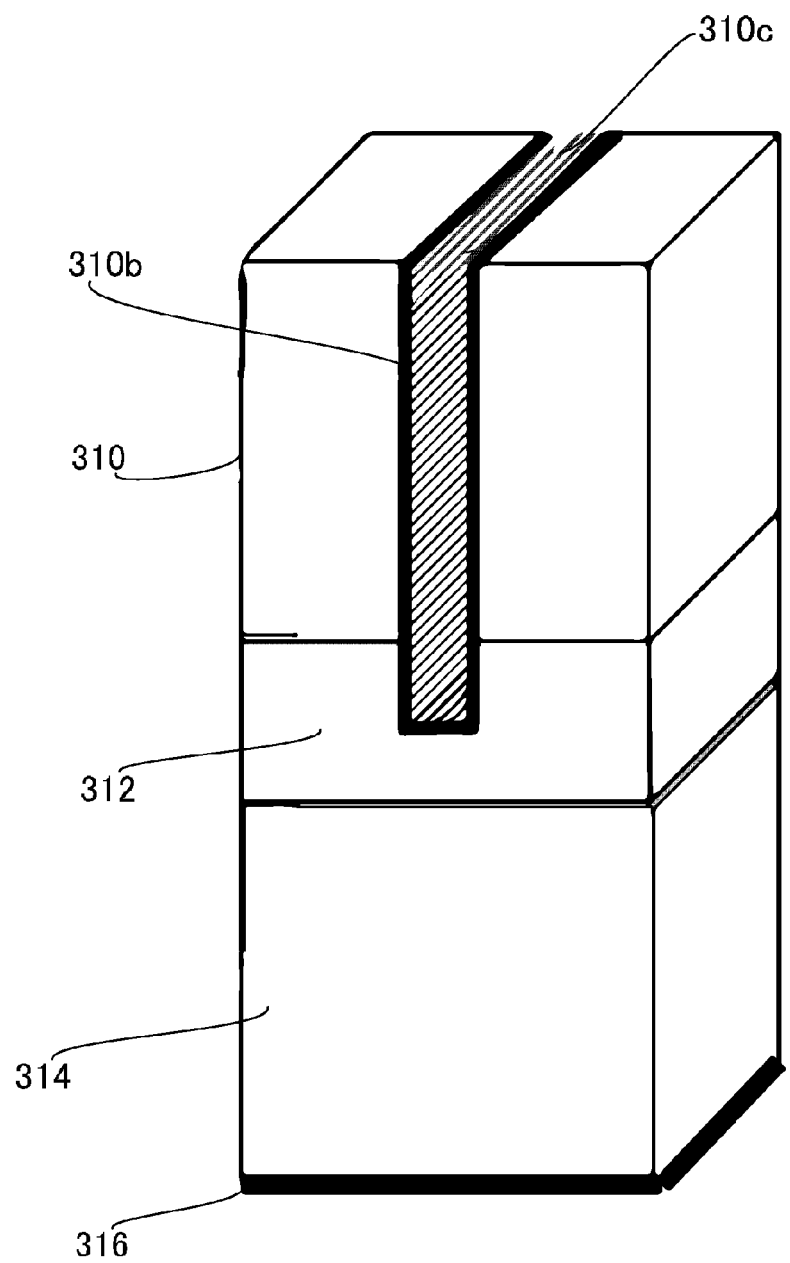
FIG. 19B is a schematic perspective view showing the resin filling the groove of FIG. 19A.

Next, with reference to FIG. 18, FIG. 19A and FIG. 19B, the non-conductive acoustic matching layer 310 and the piezoelectrics 314 of the ultrasound transducer 300 of Embodiment 3 are set forth. FIG. 18 is a schematic perspective view showing the laminate of the acoustic matching layer (311, 310), the front surface electrode 312, and the piezoelectrics 314 related to Embodiment 3. FIG. 19A is a schematic perspective view showing the groove 310a of the laminate of the non-conductive acoustic matching layer 310, the front surface electrode 312, and the piezoelectrics 314 related to Embodiment 3. FIG. 19B is a schematic perspective view showing the state of filling the groove 10a of FIG. 19A the resin.

The conductive path (groove 310a) from the front surface electrode 312 to the electric conductive acoustic matching layer 311 in the ultrasound transducer 300 related to Embodiment 3 is, as shown in FIG. 18, provided from the front surface of the non-conductive acoustic matching layer 310 to mid-way of the front surface electrode 312. Here, the front surface electrode 312 in this embodiment has, for example, a thickness of approximately 20 µm; therefore, in the same manner as Embodiment 1 and Embodiment 2, a groove of approximately 10 µm may be provided in the front surface electrode 312.

As shown in FIG. 19A, the groove 310a is provided to penetrate the non-conductive acoustic matching layer 310 from the boundary surface with the electric conductive acoustic matching layer 311 of the non-conductive acoustic matching layer 310 (front surface of the non-conductive acoustic matching layer 310) to the boundary surface of the non-conductive acoustic matching layer 310 with the front surface electrode 312 (back surface of the non-conductive acoustic matching layer 310) to penetrate the front surface of the front surface electrode 312, leading up to mid-way of the front surface electrode 312. Here, "mid-way of the front surface electrode 312," for example, indicates the location approximately 10 µm heading from the front surface of the front surface electrode 312 (opposite direction as z direction of FIG. 17) (depth of groove 310a).

Moreover, the groove 310a of Embodiment 3 is provided to extend from one side to the other opposite side in the element array direction (in columns or rows/x or y direction of FIG. 17). That is, the groove 310a is provided to penetrate the non-conductive acoustic matching layer 310 and the front surface electrode 312 in the element array direction. According to the configuration of such a groove 310a, the groove may be provided at once to respective elements belonging to one column or one row of the element array (refer to FIGS. 22 to 24), in order to form the groove 310a with respect to each element (laminate of the non-conductive acoustic matching layer 310 and the front surface electrode 312). Moreover, the element array direction is the direction perpendicular to the front-back direction of the ultrasound transducer 300. Moreover, if a groove may be provided at once to the respective elements belonging to one column or one row, the elements located on both ends of the element array direction do not necessarily need to be penetrated in the element array direction.

Moreover, inside the groove 310a shown in FIG. 19A, the conductive film 310b is provided throughout the entire surface thereof by plating, spattering, etc. The groove 310a is provided from the front surface of the non-conductive acoustic matching layer 310 to mid-way of the front surface electrode 312 via the front surface of the front surface electrode 312, and the conductive film 310b continues from mid-way of the front surface electrode 312 leading to the electric conductive acoustic matching layer 311. That is, because the conductive film 310b is provided throughout the entire surface of the groove 310a, one end is electrically conducted from another end of the groove 310a. As a result, the front surface electrode 312 contacts the rear end portion of the conductive film 310b, and is electrically conducted with the electric conductive acoustic matching layer 311 adjacent to the front surface of the non-conductive acoustic matching layer 310. Furthermore, the front surface electrode 312 is electrically conducted with the connecting lead such as the wiring pattern, etc., of the front substrate 322 via the electric conductive acoustic matching layer 311.

Moreover, as shown in FIG. 19B, in Embodiment 3 as well, the resin 310c is filled further inside the conductive film 310b of the groove 310a of the non-conductive acoustic matching layer 310 and the electric conductive acoustic matching layer 311. Due to filling of this resin 310c, the effect from forming the groove 310a in the non-conductive acoustic matching layer 310 may be suppressed. However, depending on the figure of the element (laminate) and/or the vibration mode of the ultrasound transducer 300, it is necessary to avoid acoustic effects caused by the presence of the groove 310a by filling the resin 310c; however, the resin 310c does not need to be provided in other cases.

Furthermore, when using the groove 310a as the subdie, the groove 310a may be left as a gap, or the desired medium may be filled. Moreover, the front surface electrode 312 and the electric conductive acoustic matching layer 311 should be electrically conducted; therefore, for example, within the inner surface of the groove 310a, the conductive film 310b should be provided to penetrate the area extending from the front surface end portion of the non-conductive acoustic matching layer 310 to the front surface electrode 312. Moreover if it is possible to provide the connecting led, such configuration may also be adopted.

Moreover, without limiting to the configuration illustrated in FIGS. 17 to 19A and FIG. 19B, a plurality of grooves 310a may be provided. Moreover, there may be three or more acoustic matching layers, and for example, the acoustic matching layer may be attended in front of the front substrate 322. Moreover, the optimal groove width of the groove 310a is the same as in Embodiment 1 and Embodiment 2.

(Abstract of the Manufacturing Method of the Ultrasound Transducer)

Next, with reference to FIGS. 20 to 24, the manufacturing method of the ultrasound transducer 300 related to Embodiment 3, particularly the process of providing the groove 310a of the non-conductive acoustic matching layer 310 and the front surface electrode 312 is mainly set forth. FIGS. 20 to 24 are schematic perspective views showing the manufacturing process of the ultrasound transducer 300 related to Embodiment 3.

Figure 20:
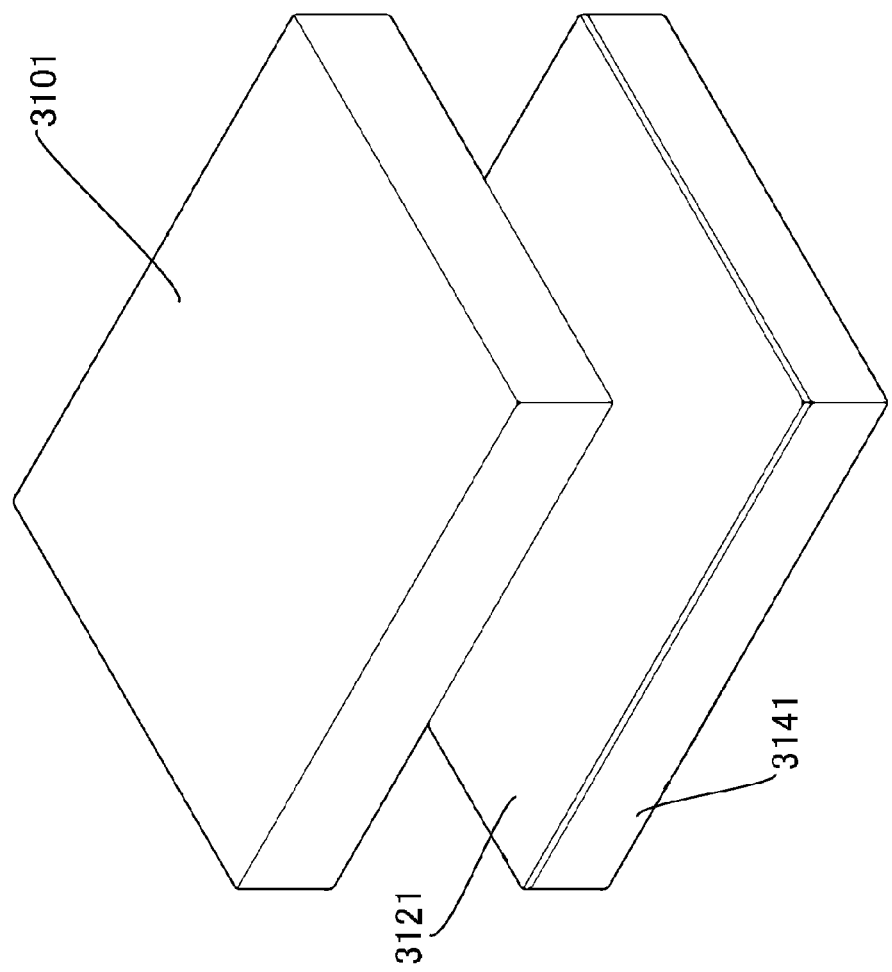
FIG. 20 is a schematic perspective view showing a part of the manufacturing process of the ultrasound transducer related to Embodiment 3.
Figure 21:
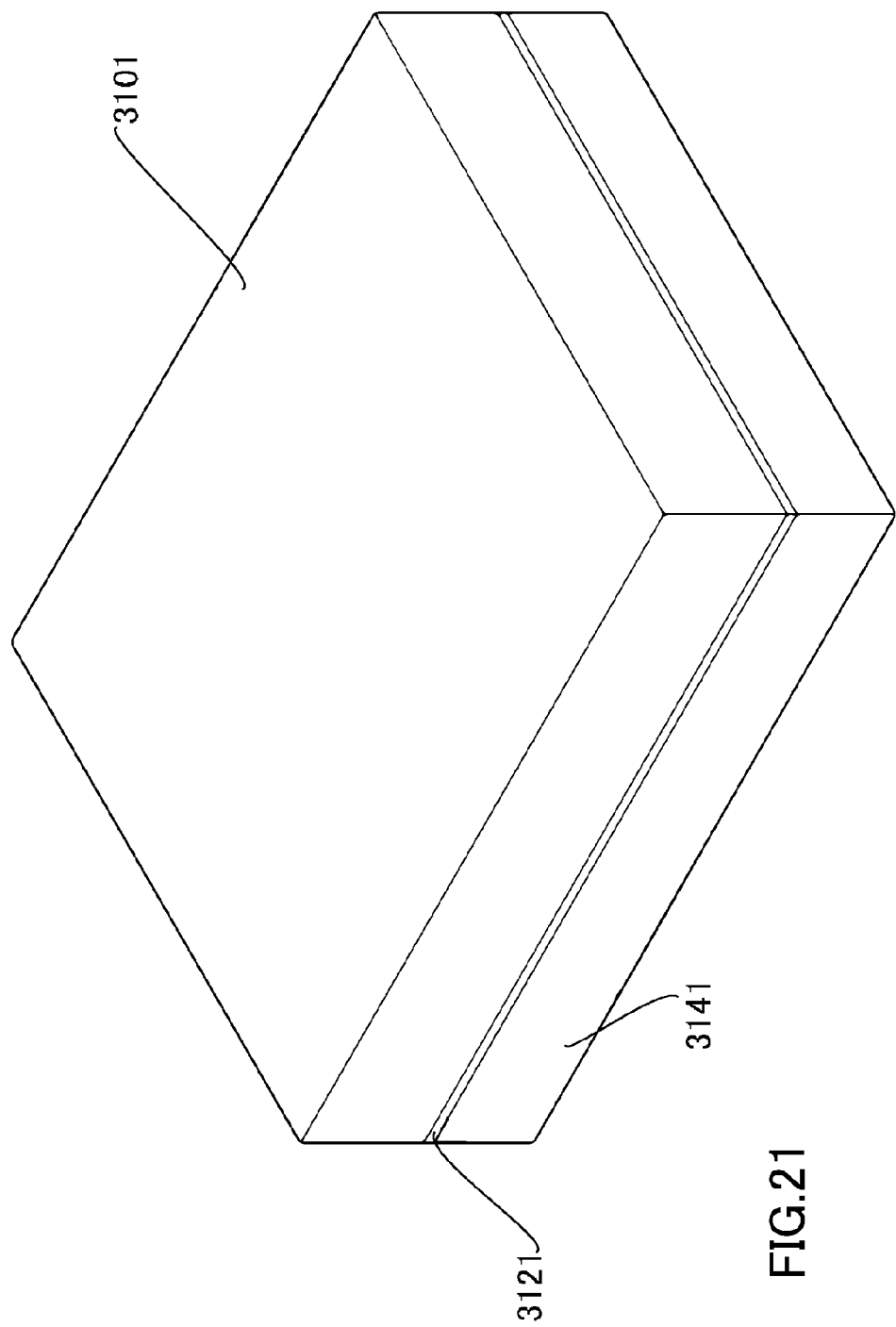
FIG. 21 is a schematic perspective view showing the process following FIG. 20 within the manufacturing process of the ultrasound transducer related to Embodiment 3.

<Block Connection/FIG. 20/FIG. 21>

As illustrated in FIGS. 17 to 19A and FIG. 19B, the acoustic matching layer in the ultrasound transducer 300 of Embodiment 3 is configured by layering the non-conductive acoustic matching layer 310 and the electric conductive acoustic matching layer 311. However, in Embodiment 3 as well, as shown in FIG. 20, the non-conductive material block 3101, the front surface electrode board 3121, and the piezoelectrics material block 3141 are layered before forming this layered acoustic matching layer. The thickness of this front surface electrode board 3121 is, for example, approximately 20 μm. Furthermore, it is assumed that the layer of the back surface electrode 316 is formed in advance on the back surface of the piezoelectrics material block 3141.

That is, as shown in FIG. 21, the respective widest surfaces of the piezoelectrics material block 3141 and the non-conductive material block 3101 provided with the front surface electrode board 3121 are overlapped and connected. Furthermore, in the subsequent procedure, the split grooves are formed on each of these laminates in procession (x or y direction of FIG. 17), and as shown in FIG. 17, the laminates as many as the designated element number are formed.

Figure 22:
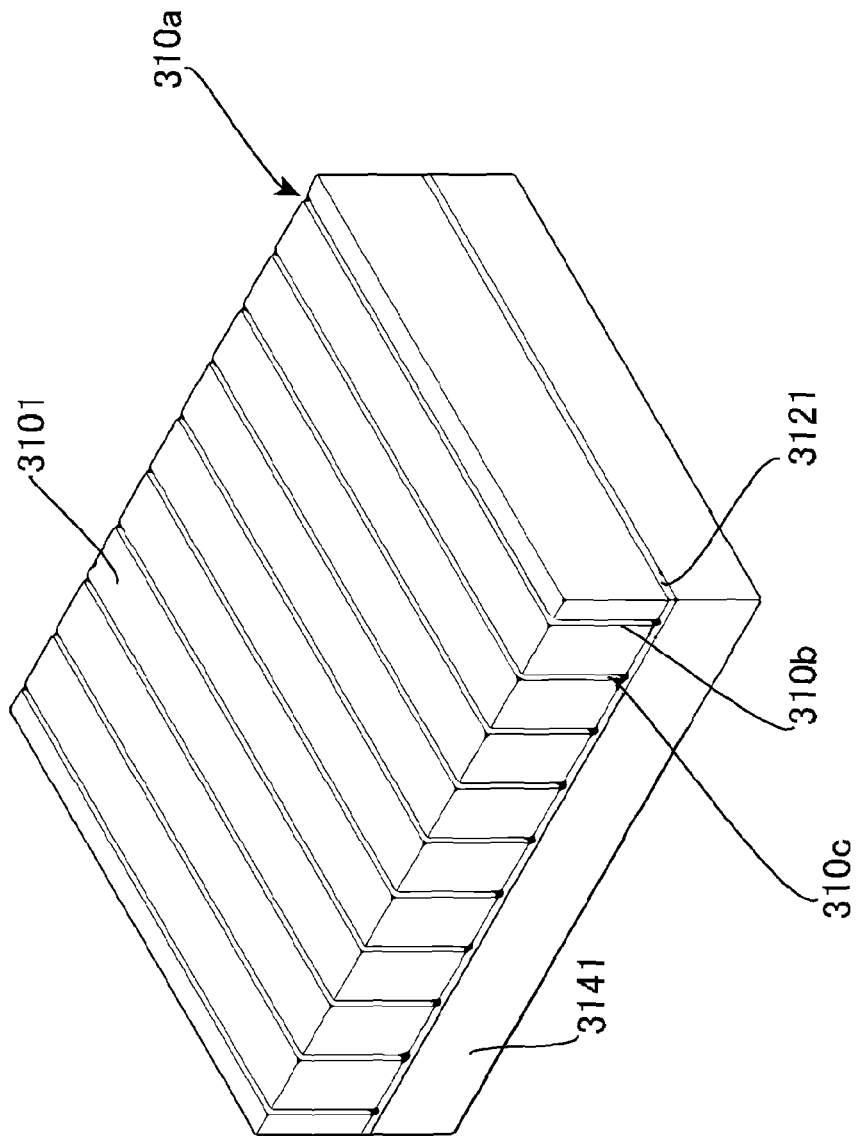
FIG. 22 is a schematic perspective view showing the process following FIG. 21 within the manufacturing process of the ultrasound transducer related to Embodiment 3.
Figure 23:
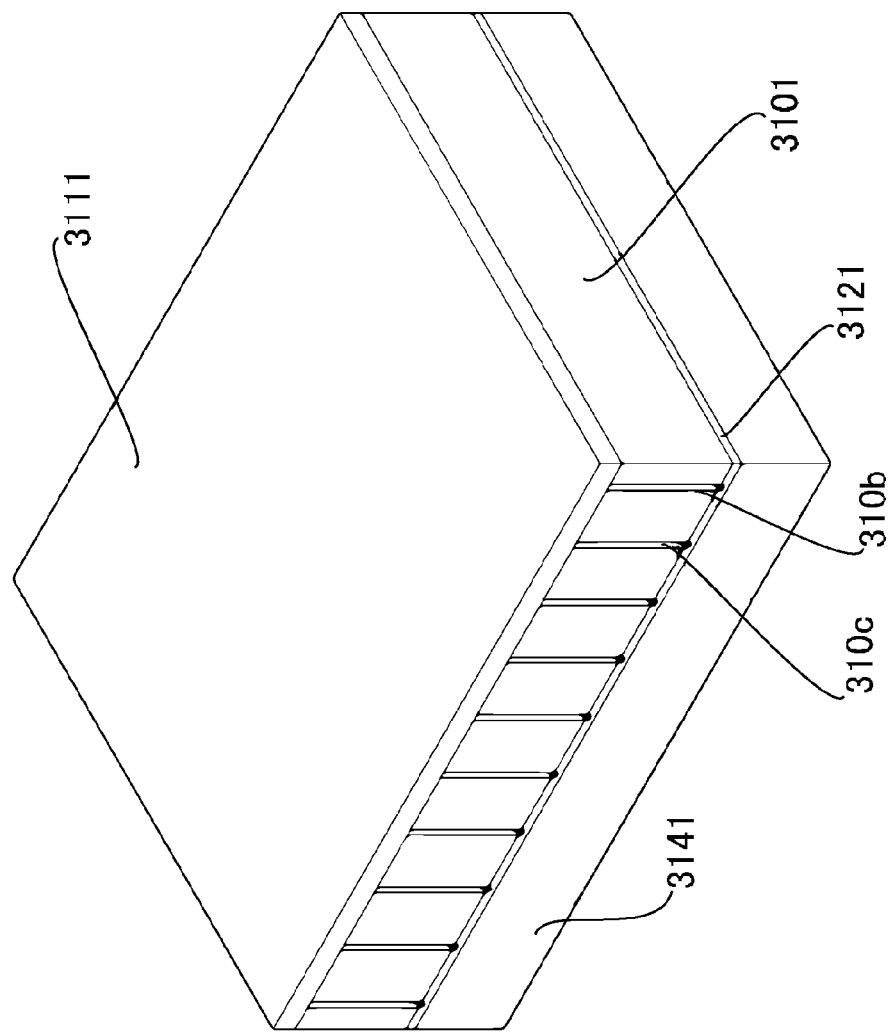
FIG. 23 is a schematic perspective view showing the process following FIG. 22 within the manufacturing process of the ultrasound transducer related to Embodiment 3.
Figure 24:
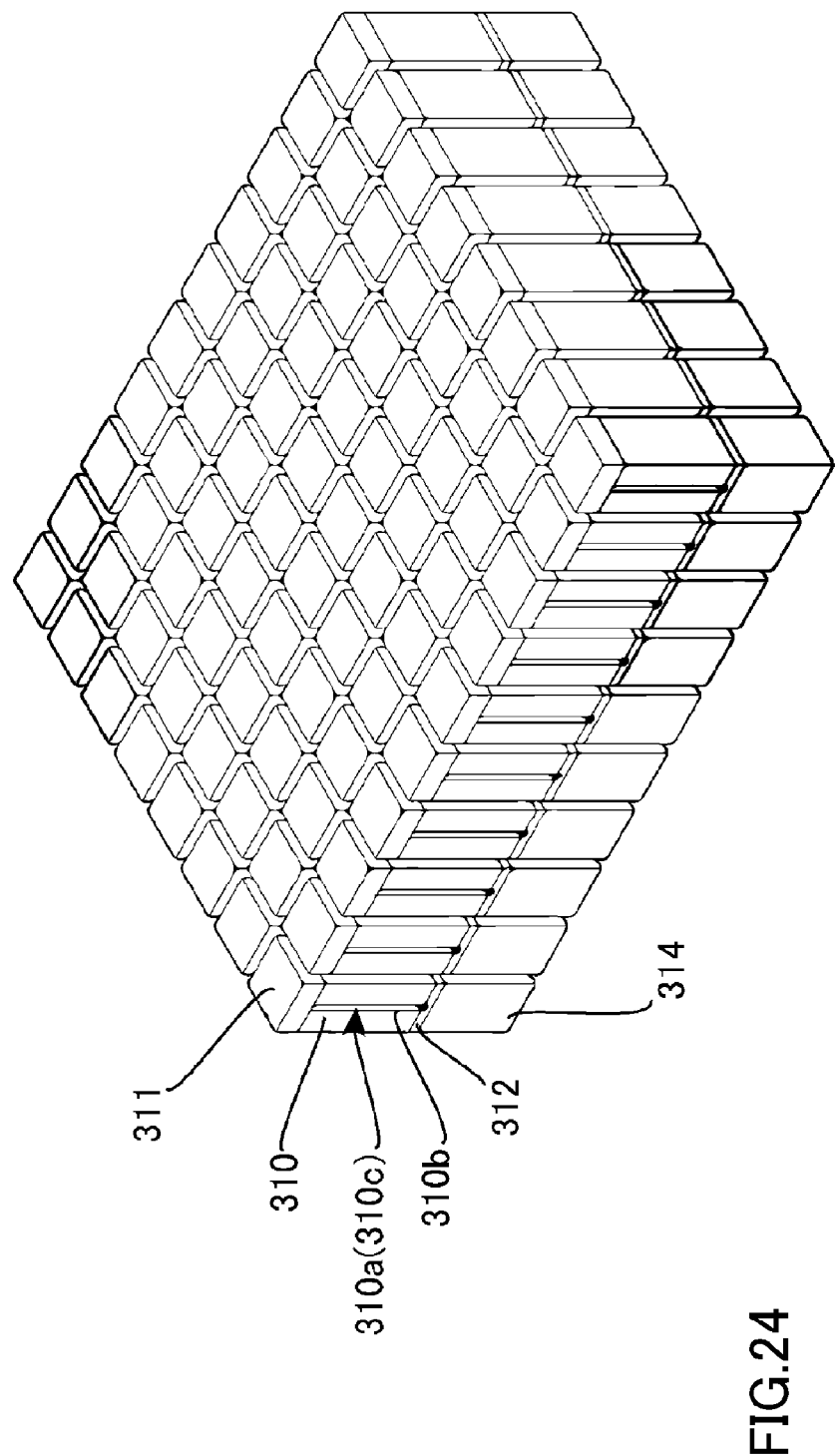
FIG. 24 is a schematic perspective view showing the process following FIG. 23 within the manufacturing process of the ultrasound transducer related to Embodiment 3.

<Groove Forming/FIG. 22>

After connecting the non-conductive material block 3101 with the piezoelectrics material block 3141 provided with the front surface electrode board 3121, the groove 310a is provided on these laminates. That is, as shown in FIG. 22, the groove 310a is provided to the opposite side of the connection surface in the non-conductive material block 3101 (front surface of the non-conductive material block 3101), penetrating the non-conductive material block 3101 up to mid-way of the front surface electrode board 3121. Moreover, the "connection surface" indicates the connection surface with the piezoelectrics material block 3141.

In the same manner as Embodiment 1 and Embodiment 2, a plurality of the grooves 310a are provided by a pitch corresponding to the element pitch of the ultrasound transducer 300. Moreover, the number of grooves 310a in FIG. 22 is conceptually shown.

An example of the amount cut-in to the front surface electrode board 3121 in forming the groove 310a is approximately 10 μm with respect to the front surface electrode board 3121 with a thickness of 20 μm. Moreover, the cutting width in forming the groove 310a is approximately 30% or less of the element width and 10 μm or more, making it effective for the radiation performance of the ultrasound pulse, the vibration mode of the ultrasound transducer 300, and the formation process of the conductive film 310b, etc.

Moreover, the process from the forming process of the conductive film 310b and the forming process of the resin 310c to the process of configuring the split grooves to the laminate of the non-conductive material block 3101, the piezoelectrics material block 3141, and the electric conductive material block 3111 of Embodiment 2 is the same as in Embodiment 2 (refer to FIG. 23 and FIG. 24), so descriptions are omitted.

Moreover, the connecting procedure of the front substrate 322 and the rear substrate 320, the connecting procedure of the backing material 318, and the connecting procedure of the acoustic lens 302 of Embodiment 3 is the same as that of Embodiment 1, so descriptions thereof are omitted.

(Function/Effect)

The function and effect of the ultrasound probe including the ultrasound transducer 300 related to Embodiment 3 mentioned above is set forth.

As set forth above, in the ultrasound transducer 300 of Embodiment 3, the groove 310a is provided in each of the non-conductive acoustic matching layers 310 arranged in front of the piezoelectrics 314, penetrating from the boundary surface with the electric conductive acoustic matching layer 311 leading to at least the boundary surface with the front surface electrode 312. Further, this groove 310a does not stop at the front surface of the front surface electrode 312, but continues to mid-way of the front surface electrode 312. That is, as shown in FIG. 19A, the groove 310a is provided from the mid-portion of the front surface electrode 312 via the non-conductive acoustic matching layer 310 leading to the front surface of the electric conductive acoustic matching layer 311. Moreover, inside the groove 310a, the conductive film 310b is provided to penetrate the area extending from at least the mid-portion of the front surface electrode 312 (rear end of the groove 310a) via the non-conductive acoustic matching layer 310 to the electric conductive acoustic matching layer 311.

Regarding the manufacturing process of the ultrasound transducer 300 comprising this non-conductive acoustic matching layer 310, the conductive path from the front surface electrode 312 to the front substrate 322 may be provided by the following procedure alone: layering the non-conductive material block 3101 and the piezoelectrics material block 3141 provided with the front surface electrode board 3121; then, forming the grooves 310a as many as the columns or rows in the direction of columns or rows of the elements after splitting of the two-dimensional array; connecting the electric conductive material block 3111; and subsequently providing the split grooves in processions with respect to these laminates, thereby forming the two-dimensional array of the element configured by comprising piezoelectrics 314, the front surface electrode 312, the laminate of the non-conductive acoustic matching layer 310 as well as the electric conductive acoustic matching layer 311.

The ultrasound transducer 300 manufactured by such a manufacturing process allows the complication of forming the conductive path of the electric conductive acoustic matching layer 311 and the complication of the manufacturing process of the ultrasound transducer 300 to be avoided and achieves forming of the conductive path from the front surface electrode 312 to the front substrate 322. That is, the configuration of the groove 310a and the conductive film 310b leading up to mid-way of the front surface electrode 312 allows the conductive path from the front surface electrode 312 to the electric conductive acoustic matching layer 311 to be surely formed, and in addition, the process of forming the groove 310a involves layering the electric conductive material block 3111 after forming the groove 310a in the laminate of the non-conductive material block 3101, the front surface electrode board 3121, and the piezoelectrics material block 3141, making it simple.

[Modified Embodiment]

Next, the modified embodiments of the ultrasound transducer related to Embodiment 1 to Embodiment 3 described above are set forth.

(First Modified Embodiment)

As shown in FIGS. 1, 9, and 17, in the ultrasound transducer mentioned above, the groove (110a, 210a, or 310a) leading to mid-way of a structure arranged in front or rear of the non-conductive acoustic matching layer (110, 210, or 310) was provided to configure the conductive path. However, not limiting to this configuration, for example, the groove may be provided from the front surface of the electric conductive acoustic matching layer to penetrate the electric conductive acoustic matching layer and the non-conductive acoustic matching layer, leading to mid-way of the piezoelectrics (or mid-way of the thick front surface electrode).

In this modified embodiment, for example, following split groove forming in order to form the two-dimensional array of the element or at layering of the non-conductive material block, electric conductive material block, and piezoelectrics material block, the groove may be provided as the conductive path. However, in this modified embodiment, for example, acoustic effects due to the groove in the electric conductive acoustic matching layer must be avoided. In this modified embodiment as well, the complication of forming the conductive path of the non-conductive acoustic matching layer may be avoided and forming the conductive path form the front surface electrode to the front substrate may be achieved.

[Second Modified Embodiment]

As shown in FIGS. 1, 9, and 17, in the ultrasound transducer mentioned above, the electric conductive acoustic matching layer (111, 211, or 311) is arranged on the front surface side of the non-conductive acoustic matching layer (110, 210, or 310), and furthermore, is configured to arrange the front substrate (122, 222, or 322) on the front surface side of the electric conductive acoustic matching layer, so that the non-conductive acoustic matching layer and the front substrate are electrically connected via the electric conductive acoustic matching layer. However, not limiting to this configuration, providing the front substrate on the front surface side of the non-conductive acoustic matching layer without including the electric conductive acoustic matching layer is also possible.

Furthermore, in the ultrasound transducer 100 of Embodiment 1, the groove 110a is provided extending from the back surface of the conductive acoustic matching layer 110 to the electric conductive acoustic matching layer 111. When this modified embodiment is applied to the ultrasound transducer 100 of Embodiment 1, the groove 110a is provided leading up to mid-way of the front substrate 122, and not the electric conductive acoustic matching layer 111.

Moreover, regarding the manufacturing method of the ultrasound transducer related to the modified embodiment, only the areas different from Embodiment 1 to Embodiment 3 mentioned above are set forth.

<Application Example to the Ultrasound Transducer 100>

When applying this modified embodiment to the ultrasound transducer 100, first, the front substrate 122 is connected to the front surface of the non-conductive material block 1101. Next, the groove 110a is provided from the opposite side of the connection surface in the non-conductive material block 1101 (back surface of the non-conductive material block 1101) up to mid-way of the front substrate 122 to penetrate the non-conductive material block 1101. Then, the conductive film 110b is provided to each groove 110a and is filled with the resin 110c. Next, the non-conductive material block 1101 and the piezoelectrics material block 1141 are connected. Next, the split grooves are provided on the laminate of the non-conductive material block 1101 and the piezoelectrics material block 1141 in a procession. In the forming process of these split grooves, there is a case in which the grooves are split by including the front substrate 122 and a case in which they are split without including the front substrate 122.

When splitting including the front substrate 122, a circuit board that conducts each of the split front substrate 122 with the electric circuit such as the transmitter-receiver circuit, etc., may be arranged, for example, at the further front surface side of the front substrate 122.

When not splitting the front substrate 122, the split grooves leading up to mid-way of the front substrate 122 may be configured, and the non-conductive material block 1101 and the piezoelectrics material block 1141 alone may be split so as not to scrape away the front substrate 122.

<Application Example to the Ultrasound Transducer 200>

When applying this modified embodiment to the ultrasound transducer 200 of Embodiment 2, first, the non-conductive material block 2101 and the piezoelectrics material block 2141 are layered, with the layer of the front surface electrode 212 and the layer of the back surface electrode 216 formed in advance. Next, the groove 210a is provided penetrating the non-conductive material block 2101 from the opposite side of the connection surface in the non-conductive material block 2101 (front surface of the non-conductive material block 2101) up to mid-way of the piezoelectrics material block 2141. Then, the conductive film 210b is provided to the respective grooves 210a and is filled with the resin 210c. Then, the split grooves are provided in procession with respect to the laminate of the non-conductive material block 2101 and the piezoelectrics material block 2141. Next, the front substrate 222 is connected to the front surface of the non-conductive acoustic matching layer 210 split in the two-dimensional array, and the rear substrate 220 is connected to the back surface of the back surface electrode 216 of the piezoelectrics 214 in the same manner.

<Example of Adaption to the Ultrasound Transducer 300>

When applying this modified embodiment to the ultrasound transducer 300 of Embodiment 3, first, the non-conductive material block 3101 and the piezoelectrics material block 3141 with the layer of the front surface electrode board 3121 and the back surface electrode 316 formed in advance are layered. Next, the groove 310a is provided penetrating the non-conductive material block 3101 from the opposite side of the connection surface of the non-conductive material block 3101 (front surface of the non-conductive material block 3101) up to mid-way of the front surface electrode board 3121. Next, the conductive film 310b is provided to the respective grooves 310a, and is filled with the resin 310c. Next, the split grooves are provided in procession with respect to the laminate of the non-conductive material block 3101 and the piezoelectrics material block 3141. Then, the front substrate 322 is connected to the front surface of the non-conductive acoustic matching layer 310 split into two-dimensional array, and the rear substrate 320 is connected to the back surface of the back surface electrode 316 of the piezoelectrics 314 in the same manner.

In the ultrasound transducer of Embodiment 1 to Embodiment 3 in which the modified embodiment was applied, both avoiding complications in forming the conductive path of the non-conductive acoustic matching layer and forming the conductive path from the front surface electrode to the front substrate may be achieved.

The embodiments have been described are set forth; however, the embodiments described above were presented as examples and are not intended to limit the range of the invention. These new embodiments may be carried out in various other configurations, and various abbreviations, replacements, and changes may be made in a scope not departing from the summary of the invention. These embodiments and deformations thereof are included in the range and summary of the invention and included in the invention described in the range of patent claims as well as the range of the equivalent thereof.

EXPLANATION OF SYMBOLS 100, 200, 300 Ultrasound transducer
102, 202, 302 Acoustic lens
110, 210, 310 Non-conductive acoustic matching layer
110a, 210a, 310a Groove
110b, 210b, 310b Conductive film
110c, 210c, 310a Resin
111, 211, 311 Electric conductive acoustic matching layer
112, 212, 312 Front surface electrode
114, 214, 314 Piezoelectrics
116, 216, 316 Back surface electrode
118, 218, 318 Backing material
120, 220, 320 Rear substrate
122, 222, 322 Front substrate
1101, 2101, 3101 Non-conductive material block
1111, 2111, 3111 Electric conductive material block
1141, 2141, 3141 Piezoelectrics material block
3121 Front surface electrode plate

What is claimed is:

1. An ultrasound transducer, comprising:
   a plurality of two-dimensionally arranged piezoelectrics,
   electrodes arranged on the respective plurality of piezoelectrics,
   a non-conductive acoustic matching layer with a first surface on the electrode side and a second surface on the opposite side of the first surface, two-dimensionally arranged according to the piezoelectrics,
   a conductive acoustic matching layer arranged on the second surface side, and
   a substrate arranged on the opposite side of the non-conductive acoustic matching layer with respect to the conductive acoustic matching layer, wherein,
   a plurality of grooves are formed which penetrates the non-conductive acoustic matching layer between the first surface and the second surface, and extends into mid-way of the piezoelectrics of the first surface side or mid-way of the conductive acoustic matching layer of the second surface side, and
   the electrode and the substrate are electrically conducted via the grooves.

2. An ultrasound transducer, comprising:
   a plurality of two-dimensionally arranged piezoelectrics,
   electrodes arranged on the respective plurality of piezoelectrics,
   a non-conductive acoustic matching layer with a first surface on the electrode side and a second surface on the opposite side of the first surface, two-dimensionally arranged according to the piezoelectrics, and
   a substrate arranged on the second surface side, wherein,
   a plurality of grooves are formed which penetrates the non-conductive acoustic matching layer between the first surface and the second surface, and extends into mid-way of the piezoelectrics of the first surface side or mid-way of the substrate of the second surface side, and
   the electrode and the substrate are electrically conducted via the grooves.

3. The ultrasound transducer according to claim 1, wherein,
   the plurality of grooves are formed to penetrate the non-conductive acoustic matching layer extending to mid-way of the conductive acoustic matching layer contacting the second surface.

4. The ultrasound transducer according to claim 2, wherein,
   the plurality of grooves are formed to penetrate the non-conductive acoustic matching layer extending to mid-way of the substrate contacting the second surface.

5. The ultrasound transducer according to claim 1 or claim 2, wherein,
   the plurality of grooves are formed to penetrate the non-conductive acoustic matching layer and the electrodes extending to mid-way of the piezoelectrics contacting the first surface.

6. An ultrasound transducer, comprising:
   a plurality of two-dimensionally arranged piezoelectrics,
   electrodes provided on the respective plurality of piezoelectrics,
   a non-conductive acoustic matching layer with a first surface on the electrode side and a second surface on the opposite side of the first surface, two-dimensionally arranged according to the piezoelectrics, and a substrate arranged on the second surface side, wherein,
a plurality of grooves are formed which penetrates the non-conductive acoustic matching layer between the first surface and the second surface, and extends into mid-way of the electrode of the first surface, and
the electrode and the substrate are electrically conducted via the groove.

7. The ultrasound transducer according to claim 6, wherein, the plurality of grooves is formed to penetrate the non-conductive acoustic matching layer extending to mid-way of the electrode contacting the first surface.

8. The ultrasound transducer according to any one claim among claim 1, claim 2 or claim 6, wherein, an electric conductive material is provided from the first surface to the second surface inside the plurality of grooves.

9. The ultrasound transducer according to any one claim among claim 1, claim 2 or claim 6, wherein, the plurality of grooves is formed in one direction or both directions among two directions in which the two-dimensionally arranged non-conductive acoustic matching layer is orthogonally intersecting, and is provided to penetrate a plurality of the non-conductive acoustic matching layers.

10. A manufacturing method of the ultrasound transducer, comprising:
a step of forming a laminate by layering, on a non-conductive acoustic matching layer, a piezoelectric in which a substrate, a conductive acoustic matching layer, or an electrode is provided, and
a step of forming grooves that penetrate the non-conductive acoustic matching layer from an opposite surface of a laminate plane in the laminate and extending into mid-way of the substrate, mid-way of the conductive acoustic matching layer, or mid-way of the piezoelectric.

11. The manufacturing method of the ultrasound transducer according to claim 10, wherein,
the laminate comprises the non-conductive acoustic matching layer and the conductive acoustic matching layer, further comprising:
a step of layering the piezoelectric on the opposite surface of the non-conductive acoustic matching layer of the laminate, and
a step of splitting the laminate and the piezoelectric in two orthogonally intersecting directions.

12. The manufacturing method of the ultrasound transducer according to claim 10, wherein,
the laminate comprises the non-conductive acoustic matching layer and the substrate, further comprising:
a step of layering the piezoelectric on the opposite surface of the non-conductive acoustic matching layer of the laminate, and
a step of splitting at least the non-conductive acoustic matching layer and the piezoelectric among the laminate and the piezoelectric in two orthogonally intersecting directions.

13. The manufacturing method of the ultrasound transducer according to claim 10, wherein,
the laminate comprises the non-conductive acoustic matching layer and the substrate, further comprising:
a step of layering the conductive acoustic matching layer on the opposite surface of the non-conductive acoustic matching layer of the laminate, and
a step of splitting the laminate and the conductive acoustic matching layer in two orthogonally intersecting directions.

14. The manufacturing method of the ultrasound transducer according to claim 10, wherein,
the laminate comprises the non-conductive acoustic matching layer and the substrate, further comprising:
a step of splitting the laminate in two orthogonally intersecting directions, and
a step of layering the substrate on the opposite surface of the non-conductive acoustic matching layer of the laminate.

15. A manufacturing method of an ultrasound transducer, comprising:
a step of forming a laminate by layering the piezoelectric provided with an electrode on one surface of a non-conductive acoustic matching layer, and
a step of forming a plurality of groove that penetrates the non-conductive acoustic matching layer from an opposite surface of a lamination plane of the laminate and that extends into mid-way of the layered piezoelectric.

16. The manufacturing method of the ultrasound transducer according to claim 15, further comprising:
a step of layering a conductive acoustic matching layer on the opposite surface of the non-conductive acoustic matching layer of the laminate, and
a step of splitting the laminate and the conductive acoustic matching layer in two orthogonally intersecting directions.

17. The manufacturing method of the ultrasound transducer according to claim 15, wherein,
the laminate comprises the non-conductive acoustic matching layer, the electrode and the piezoelectric, further comprising:
a step of splitting the laminate in two orthogonally intersecting directions, and
a step of layering a substrate on the opposite surface of the non-conductive acoustic matching layer of the laminate.

18. An ultrasound probe, comprising:
an ultrasound transducer, and
an interface between the ultrasound transducer and an external device, wherein,
the ultrasound transducer comprises:
a plurality of two-dimensionally arranged piezoelectrics,
electrodes arranged on the respective plurality of piezoelectrics,
a non-conductive acoustic matching layer with a first surface on the electrode side and a second surface on an opposite side of the first surface, two-dimensionally arranged according to the piezoelectrics,
a conductive acoustic matching layer arranged on the second surface side, and
a substrate arranged on the opposite side of the non-conductive acoustic matching layer with respect to the conductive acoustic matching layer, wherein in the ultrasound transducer,
a plurality of grooves are formed which penetrates the non-conductive acoustic matching layer between the first surface and the second surface, and extends into mid-way of the piezoelectrics of the first surface side or mid-way of the conductive acoustic matching layer of the second surface side, and the electrode and the substrate are electrically conducted via the grooves.

19. An ultrasound probe, comprising:
an ultrasound transducer, and
an interface between the ultrasound transducer and an external device, wherein,
the ultrasound transducer comprises:
a plurality of two-dimensionally arranged piezoelectrics,
electrodes arranged on the respective plurality of piezoelectrics, a non-conductive acoustic matching layer with a first surface on the electrode side and a second surface on an opposite side of the first surface, two-dimensionally arranged according to the piezoelectrics, and a substrate arranged on the second surface side, wherein in the ultrasound transducer, a plurality of grooves are formed which penetrates the non-conductive acoustic matching layer between the first surface and the second surface, and extends into mid-way of the piezoelectrics of the first surface side or mid-way of the substrate of the second surface side, and the electrode and the substrate are electrically conducted via the grooves.

20. An ultrasound probe, comprising:

an ultrasound transducer, and an interface between the ultrasound transducer and a external device, wherein, the ultrasound transducer comprises:

a plurality of two-dimensionally arranged piezoelectrics, electrodes provided on the respective plurality of piezoelectrics, a non-conductive acoustic matching layer with a first surface on the electrode side and a second surface on an opposite side of the first surface, two-dimensionally arranged according to the piezoelectrics, and a substrate arranged on the second surface side, wherein in the ultrasound transducer, a plurality of grooves are formed to penetrates the non-conductive acoustic matching layer between the first surface and the second surface and extends into mid-way of the electrode of the first surface, and the electrode and the substrate are electrically conducted via the groove.

* * * * *